US012613678B2

(12) United States Patent
Bucur

(10) Patent No.: US 12,613,678 B2
(45) Date of Patent: Apr. 28, 2026

(54) HYPERTEXT TRANSFER PROTOCOL RECORDER OF A ROBOTIC PROCESS AUTOMATION WORKFLOW DESIGNER APPLICATION

(71) Applicant: UIPATH, INC., New York, NY (US)

(72) Inventor: Radu-Mihai Bucur, Bucharest (RO)

(73) Assignee: UIPATH, INC., New York, NY (US)

( * ) Notice: Subject to any disclaimer, the term of this patent is extended or adjusted under 35 U.S.C. 154(b) by 651 days.

(21) Appl. No.: 17/993,335

(22) Filed: Nov. 23, 2022

(65) Prior Publication Data

US 2024/0168724 A1 May 23, 2024

(51) Int. Cl.
*G06F 8/20* (2018.01)
*H04L 67/02* (2022.01)
(52) U.S. Cl.
CPC ............... *G06F 8/20* (2013.01); *H04L 67/02* (2013.01)
(58) Field of Classification Search
CPC .................................. G06F 8/20; H04L 67/02
See application file for complete search history.

(56) References Cited

U.S. PATENT DOCUMENTS

| | | | | |
|---|---|---|---|---|
| 6,026,437 A * | 2/2000 | Muschett | ............... | G06F 9/445 |
| | | | | 709/219 |
| 10,282,282 B2 * | 5/2019 | Shavro | .................. | G06F 16/986 |
| 10,489,402 B2 * | 11/2019 | Li | .................... | G06F 16/24553 |
| 11,218,594 B1 * | 1/2022 | Sekar | ...................... | G06F 40/35 |
| 11,314,531 B1 * | 4/2022 | Mayer | ..................... | H04L 67/12 |
| 2010/0153568 A1 * | 6/2010 | Uola | ...................... | H04L 67/02 |
| | | | | 709/229 |
| 2013/0268662 A1 * | 10/2013 | Guo | ....................... | H04L 67/142 |
| | | | | 709/224 |
| 2014/0082480 A1 * | 3/2014 | Ionescu | ................. | G06F 40/103 |
| | | | | 715/234 |
| 2015/0074670 A1 * | 3/2015 | Gerganov | ............. | G06F 9/5027 |
| | | | | 718/103 |
| 2016/0105528 A1 * | 4/2016 | Holmes | ............... | H04L 67/1001 |
| | | | | 709/217 |
| 2016/0352745 A1 * | 12/2016 | Ilieva | ...................... | H04L 63/10 |
| 2019/0317736 A1 * | 10/2019 | Wood | ........................ | G06F 8/60 |
| 2021/0109767 A1 * | 4/2021 | Cohen | ...................... | G06F 8/34 |
| 2021/0110318 A1 * | 4/2021 | Singh | ..................... | G06Q 10/04 |
| 2022/0391178 A1 * | 12/2022 | Grigore | .................. | G06F 9/451 |
| 2023/0023382 A1 * | 1/2023 | Mani | ....................... | G06F 9/542 |
| 2023/0236851 A1 * | 7/2023 | Novitchi | ................. | G06F 9/542 |
| | | | | 715/764 |

* cited by examiner

*Primary Examiner* — Douglas M Slachta
(74) *Attorney, Agent, or Firm* — Volpe Koenig

(57) ABSTRACT

A method is provided. The method is implemented by a robotic process automation workflow designer application that includes a hypertext transfer protocol recorder feature. The robotic process automation workflow designer application is embodied in software stored on a memory and executed by a processor. The method includes filtering hypertext transfer protocol requests to provide filtered hypertext transfer protocol requests. The method includes recording the filtered hypertext transfer protocol request to provide recorded hypertext transfer protocol requests. The method includes converting the recorded hypertext transfer protocol requests into hypertext transfer protocol request activities. The method includes generating a sequence from the hypertext transfer protocol request activities.

20 Claims, 14 Drawing Sheets

1500

Results ✕

Deselect the requests you're not interested in:

| Use? | URL | Method | ContentType | Details |
|---|---|---|---|---|
| ☑ | https://acme-test.uipath.com/login | POST | application/x-... | View Details |
| ☑ | http://acme-test.uipath.com/ | GET | | View Details |
| ☑ | https://acme-test.uipath.com/ | GET | | View Details |
| ☑ | https://acme-test.uipath.com/work-items | GET | | View Details |
| ☑ | https://acme-test.uipath.com/work-items?page=2 | GET | | View Details |
| ☑ | https://acme-test.uipath.com/work-items?page=3 | GET | | View Details |
| ☑ | https://acme-test.uipath.com/work-items/55600445 | GET | | View Details |

Save      Export Json

1600

1700

1800

HYPERTEXT TRANSFER PROTOCOL RECORDER OF A ROBOTIC PROCESS AUTOMATION WORKFLOW DESIGNER APPLICATION

FIELD OF INVENTION

This disclosure generally relates to automation, and more specifically, to a robotic process automation (RPA) workflow designer application.

BACKGROUND

Generally, companies or enterprises apply conventional user interface (UI) automations to detect elements or form selectors. Yet, despite an ability and a power of the conventional UI automations, there are issues therewith. For instance, with legacy applications, the conventional UI automations have difficulty detecting and replacing elements or forming selectors. Further, image automation or computer vision impacts the reliability and speed of the conventional UI automations. For example, in a contact center use case, every second is valued and counts. So, if conventional UI automation techniques struggle to meet an expected average handling time, the viability of the entire RPA solution is severely impacted. In an attempt to address these difficulties, companies or enterprises conventionally analyze and replicate HTTP requests made by applications with limited success due to a lack of effectiveness, reduced development speed for this approach, and requirement for third party tools. Thus, a solution is needed to overcome the difficulties of the conventional UI automations and conventional HTTP analysis.

SUMMARY

According to one or more embodiments, a method is provided. The method is implemented by a robotic process automation workflow designer application that includes a hypertext transfer protocol recorder feature. The robotic process automation workflow designer application is embodied in software stored on at least one memory and executed by at least one processor. The method includes filtering hypertext transfer protocol requests to provide filtered hypertext transfer protocol requests. The method includes recording the filtered hypertext transfer protocol request to provide recorded hypertext transfer protocol requests. The method includes converting the recorded hypertext transfer protocol requests into hypertext transfer protocol request activities. The method includes generating a sequence from the hypertext transfer protocol request activities. The above method embodiment can be implemented as a system, a computer program product, and/or an apparatus.

BRIEF DESCRIPTION OF THE DRAWINGS

In order that the advantages of certain embodiments herein will be readily understood, a more particular description will be rendered by reference to specific embodiments that are illustrated in the appended drawings. While it should be understood that these drawings depict only typical embodiments and are not therefore to be considered to be limiting of its scope, the one or more embodiments herein will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Generally, embodiments herein pertain to automation. More specifically, embodiments herein pertain to an RPA workflow designer application.

According to one or more embodiments, the RPA workflow designer application can be performed by a computing system, a controller, and/or an RPA workflow engine executing thereon. The RPA workflow designer application is an integrated development environment (IDE) that allows the development of software that is executed on a robot controller process. A hypertext transfer protocol (HTTP) recorder feature of the RPA workflow designer application can be described as software of a robot controller or a design and robot controller that includes a framework of policies and technologies for capturing HTTP traffic and converting it to instructions or activities that will be added into the RPA workflow designer application. In contrast to the conventional UI automations that capture UI interactions, the RPA workflow designer application and the HTTP recorder feature monitor HTTP traffic and generate a sequence of HTTP request activities. One or more technical effects, advantages, and benefits of the RPA workflow designer application are that the sequence of HTTP request activities are near ready to use and require minimal code enhancements before consumption.

By way of example, the RPA workflow designer application operates to launch the HTTP recorder feature to filter HTTP requests to provide filtered HTTP requests. The HTTP recorder feature, then, records the filtered HTTP requests to provide recorded HTTP requests. Then, the recorded HTTP requests are converted into HTTP request activities grouped as a sequence of HTTP request activities. Optionally, the RPA workflow designer application may receive one or more configuration inputs for the sequence of HTTP request activities, which is now ready to be consumed (e.g., by or in a workflow). According to one or more embodiments, the RPA workflow designer application and/or the HTTP recorder feature can include a custom integration service connector builder, where captured requests (e.g., the recorded HTTP requests) are exported into the custom integration service connection builder to create custom connections. Further, the RPA workflow designer application and the HTTP recorder feature can map between display values and HTTP response to automatically generate a UI view for the RPA workflow designer application.

According to one or more technical effects, advantages, and benefits, the RPA workflow designer application and the HTTP recorder feature save time and provide robust and scalable processes. According to one or more technical effects, advantages, and benefits, the RPA workflow designer application and the HTTP recorder feature include providing attended automation processes (for hundreds even thousands of users), thereby making the sequences more accessible for customers and partners.

Figure 1:
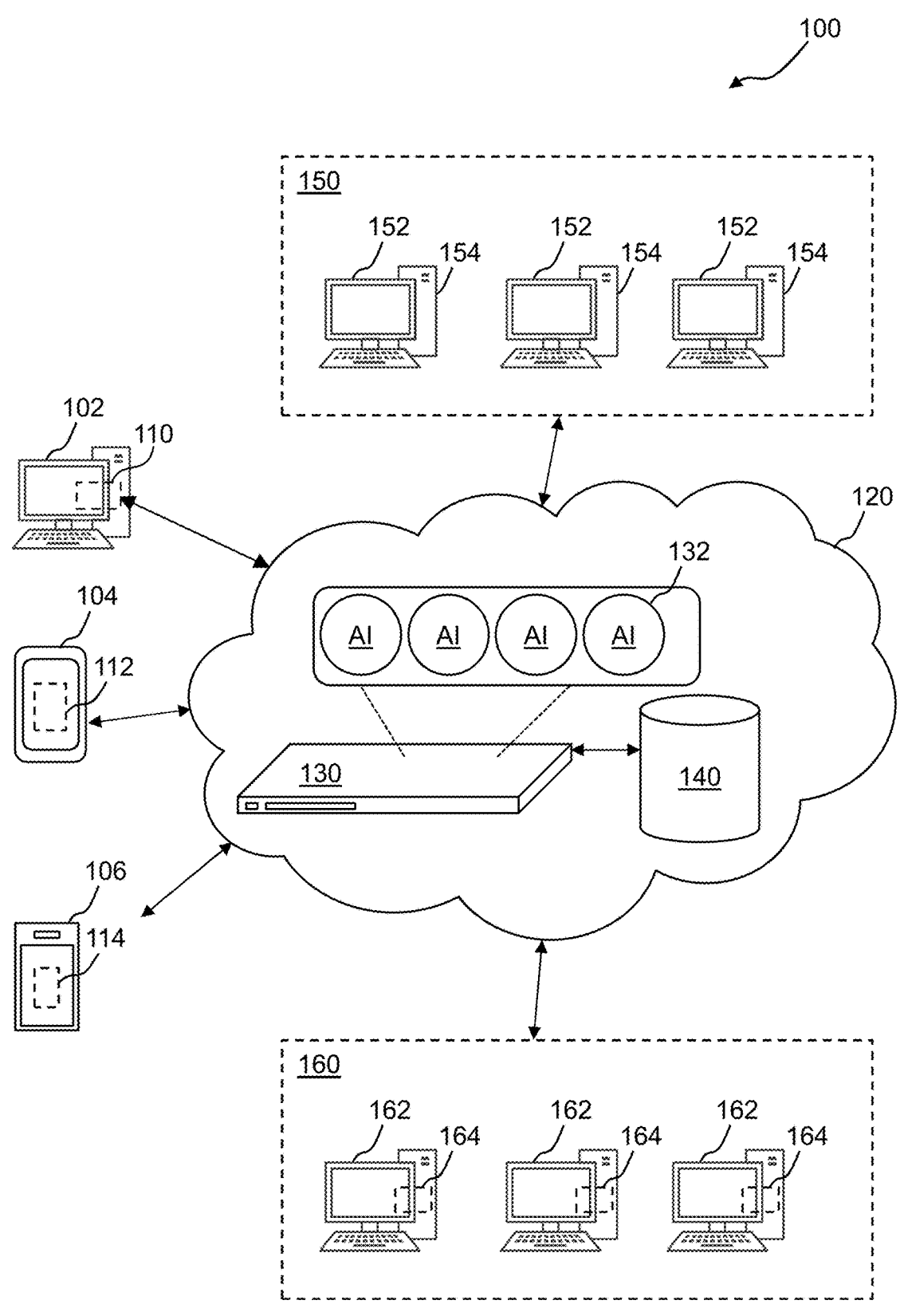
FIG. 1 depicts an architectural diagram illustrating an automation system according to one or more embodiments.

FIG. 1 is an architectural diagram illustrating a hyper-automation system 100, according to one or more embodiments. "Hyper-automation," as used herein, refers to automation systems that bring together components of process automation, integration tools, and technologies that amplify the ability to automate work. For instance, RPA may be used at the core of a hyper-automation system in some embodiments, and in certain embodiments, automation capabilities may be expanded with artificial intelligence and/or machine (AI/ML), process mining, analytics, and/or other advanced tools. As the hyper-automation system learns processes, trains AI/ML models, and employs analytics, for example, more and more knowledge work may be automated, and computing systems in an organization, e.g., both those used by individuals and those that run autonomously, may all be engaged to be participants in the hyper-automation process. Hyper-automation systems of some embodiments allow users and organizations to efficiently and effectively discover, understand, and scale automations.

Hyper-automation system 100 includes user computing systems, such as desktop computer 102, tablet 104, and smart phone 106. However, any desired computing system may be used without deviating from the scope of one or more embodiments herein including, but not limited to, smart watches, laptop computers, servers, Internet-of-Things (IoT) devices, etc. Also, while three user computing systems are shown in FIG. 1, any suitable number of computing systems may be used without deviating from the scope of the one or more embodiments herein. For instance, in some embodiments, dozens, hundreds, thousands, or millions of computing systems may be used. The user computing systems may be actively used by a user or run automatically without much or any user input.

Each computing system 102, 104, 106 has respective automation process(es) 110, 112, 114 running thereon. Automation process(es) 102, 104, 106 may include, but are not limited to, RPA robots, part of an operating system, downloadable application(s) for the respective computing system, any other suitable software and/or hardware, or any combination of these without deviating from the scope of the one or more embodiments herein. In some embodiments, one or more of process(es) 110, 112, 114 may be listeners. Listeners may be RPA robots, part of an operating system, a downloadable application for the respective computing system, or any other software and/or hardware without deviating from the scope of the one or more embodiments herein. Indeed, in some embodiments, the logic of the listener(s) is implemented partially or completely via physical hardware.

Listeners monitor and record data pertaining to user interactions with respective computing systems and/or operations of unattended computing systems and send the data to a core hyper-automation system 120 via a network (e.g., a local area network (LAN), a mobile communications network, a satellite communications network, the Internet, any combination thereof, etc.). The data may include, but is not limited to, which buttons were clicked, where a mouse was moved, the text that was entered in a field, that one window was minimized and another was opened, the application associated with a window, etc. In certain embodiments, the data from the listeners may be sent periodically as part of a heartbeat message. In some embodiments, the data may be sent to core hyper-automation system 120 once a predetermined amount of data has been collected, after a predetermined time period has elapsed, or both. One or more servers, such as server 130, receive and store data from the listeners in a database, such as database 140.

Automation processes may execute the logic developed in workflows during design time. In the case of RPA, workflows may include a set of steps, defined herein as "activities," that are executed in a sequence or some other logical flow. Each activity may include an action, such as clicking a button, reading a file, writing to a log panel, etc. In some embodiments, workflows may be nested or embedded.

Long-running workflows for RPA in some embodiments are master projects that support service orchestration, human intervention, and long-running transactions in unattended environments. See U.S. Pat. No. 10,860,905, which is incorporated by reference for all it contains. Human intervention comes into play when certain processes require human inputs to handle exceptions, approvals, or validation before proceeding to the next step in the activity. In this situation, the process execution is suspended, freeing up the RPA robots until the human task completes.

A long-running workflow may support workflow fragmentation via persistence activities and may be combined with invoke process and non-user interaction activities, orchestrating human tasks with RPA robot tasks. In some embodiments, multiple or many computing systems may participate in executing the logic of a long-running workflow. The long-running workflow may run in a session to facilitate speedy execution. In some embodiments, long-running workflows may orchestrate background processes that may contain activities performing application programming interface (API) calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

One or more of automation process(es) 110, 112, 114 is in communication with core hyper-automation system 120. In some embodiments, core hyper-automation system 120 may run a conductor application on one or more servers, such as server 130. While one server 130 is shown for illustration purposes, multiple or many servers that are proximate to one another or in a distributed architecture may be employed without deviating from the scope of the one or more embodiments herein. For instance, one or more servers may be provided for conductor functionality, AI/ML model serving, authentication, governance, and/or any other suitable functionality without deviating from the scope of the one or more embodiments herein. In some embodiments, core hyper-automation system 120 may incorporate or be part of a public cloud architecture, a private cloud architecture, a hybrid cloud architecture, etc. In certain embodiments, core hyper-automation system 120 may host multiple software-based servers on one or more computing systems, such as server 130. In some embodiments, one or more servers of core hyper-automation system 120, such as server 130, may be implemented via one or more virtual machines (VMs).

In some embodiments, one or more of automation process (es) 110, 112, 114 may call one or more AI/ML models 132 deployed on or accessible by core hyper-automation system 120. AI/ML models 132 may be trained for any suitable purpose without deviating from the scope of the one or more embodiments herein, as will be discussed in more detail herein. Two or more of AI/ML models 132 may be chained in some embodiments (e.g., in series, in parallel, or a combination thereof) such that they collectively provide collaborative output(s). AI/ML models 132 may perform or assist with computer vision (CV), optical character recognition (OCR), document processing and/or understanding, semantic learning and/or analysis, analytical predictions, process discovery, task mining, testing, automatic RPA workflow generation, sequence extraction, clustering detection, audio-to-text translation, any combination thereof, etc. However, any desired number and/or type(s) of AI/ML models may be used without deviating from the scope of the one or more embodiments herein. Using multiple AI/ML models may allow the system to develop a global picture of what is happening on a given computing system, for example. For instance, one AI/ML model could perform OCR, another could detect buttons, another could compare sequences, etc. Patterns may be determined individually by an AI/ML model or collectively by multiple AI/ML models. In certain embodiments, one or more AI/ML models are deployed locally on at least one of computing systems 102, 104, 106.

In some embodiments, multiple AI/ML models 132 may be used. Each AI/ML model 132 is an algorithm (or model) that runs on the data, and the AI/ML model itself may be a deep learning neural network (DLNN) of trained artificial "neurons" that are trained in training data, for example. In some embodiments, AI/ML models 132 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to perform the desired functionality.

Hyper-automation system 100 may provide four main groups of functionality in some embodiments: (1) discovery; (2) building automations; (3) management; and (4) engagement. Automations (e.g., run on a user computing system, a server, etc.) may be run by software robots, such as RPA robots, in some embodiments. For instance, attended robots, unattended robots, and/or test robots may be used. Attended robots work with users to assist them with tasks (e.g., via UiPath Assistant™). Unattended robots work independently of users and may run in the background, potentially without user knowledge. Test robots are unattended robots that run test cases against applications or RPA workflows. Test robots may be run on multiple computing systems in parallel in some embodiments.

The discovery functionality may discover and provide automatic recommendations for different opportunities of automations of business processes. Such functionality may be implemented by one or more servers, such as server 130. The discovery functionality may include providing an automation hub, process mining, task mining, and/or task capture in some embodiments. The automation hub (e.g., UiPath Automation Hub™) may provide a mechanism for managing automation rollout with visibility and control. Automation ideas may be crowdsourced from employees via a submission form, for example. Feasibility and return on investment (ROI) calculations for automating these ideas may be provided, documentation for future automations may be collected, and collaboration may be provided to get from automation discovery to build-out faster.

Process mining (e.g., via UiPath Automation Cloud™ and/or UiPath AI Center™) refers to the process of gathering and analyzing the data from applications (e.g., enterprise resource planning (ERP) applications, customer relation management (CRM) applications, email applications, call center applications, etc.) to identify what end-to-end processes exist in an organization and how to automate them effectively, as well as indicate what the impact of the automation will be. This data may be gleaned from user computing systems 102, 104, 106 by listeners, for example, and processed by servers, such as server 130. One or more AI/ML models 132 may be employed for this purpose in some embodiments. This information may be exported to the automation hub to speed up implementation and avoid manual information transfer. The goal of process mining may be to increase business value by automating processes within an organization. Some examples of process mining goals include, but are not limited to, increasing profit, improving customer satisfaction, regulatory and/or contractual compliance, improving employee efficiency, etc.

Task mining (e.g., via UiPath Automation Cloud™ and/or UiPath AI Center™) identifies and aggregates workflows (e.g., employee workflows), and then applies AI to expose patterns and variations in day-to-day tasks, scoring such tasks for ease of automation and potential savings (e.g., time and/or cost savings). One or more AI/ML models 132 may be employed to uncover recurring task patterns in the data. Repetitive tasks that are ripe for automation may then be identified. This information may initially be provided by listeners and analyzed on servers of core hyper-automation system 120, such as server 130, in some embodiments. The findings from task mining (e.g., extensive application markup language (XAML) process data) may be exported to process documents or to a designer application such as UiPath Studio™ to create and deploy automations more rapidly.

Task mining in some embodiments may include taking screenshots with user actions (e.g., mouse click locations, keyboard inputs, application windows and graphical elements the user was interacting with, timestamps for the interactions, etc.), collecting statistical data (e.g., execution time, number of actions, text entries, etc.), editing and annotating screenshots, specifying types of actions to be recorded, etc.

Task capture (e.g., via UiPath Automation Cloud™ and/or UiPath AI Center™) automatically documents attended processes as users work or provides a framework for unattended processes. Such documentation may include desired tasks to automate in the form of process definition documents (PDDs), skeletal workflows, capturing actions for each part of a process, recording user actions and automatically generating a comprehensive workflow diagram including the details about each step, Microsoft Word® documents, XAML files, and the like. Build-ready workflows may be exported directly to a designer application in some embodiments, such as UiPath Studio™. Task capture may simplify the requirements gathering process for both subject matter experts explaining a process and Center of Excellence (CoE) members providing production-grade automations.

Building automations may be accomplished via a designer application (e.g., UiPath Studio™, UiPath StudioX™, or UiPath Web™). For instance, RPA developers of an PA development facility 150 may use RPA designer applications 154 of computing systems 152 to build and test automations for various applications and environments, such as web, mobile, SAP®, and virtualized desktops. API integration may be provided for various applications, technologies, and platforms. Predefined activities, drag-and-drop modeling, and a workflow recorder, may make automation easier with minimal coding. Document understanding functionality may be provided via drag-and-drop AI skills for data extraction and interpretation that call one or more AI/ML models 132. Such automations may process virtually any document type and format, including tables, checkboxes, signatures, and handwriting. When data is validated or exceptions are handled, this information may be used to retrain the respective AI/ML models, improving their accuracy over time.

An integration service may allow developers to seamlessly combine user interface (UI) automation with API automation, for example. Automations may be built that require APIs or traverse both API and non-API applications and systems. A repository (e.g., UiPath Object Repository™) or marketplace (e.g., UiPath Marketplace™) for pre-built RPA and AI templates and solutions may be provided to allow developers to automate a wide variety of processes more quickly. Thus, when building automations, hyper-automation system 100 may provide user interfaces, development environments, API integration, pre-built and/or custom-built AI/ML models, development templates, integrated development environments (IDEs), and advanced AI capabilities. Hyper-automation system 100 enables development, deployment, management, configuration, monitoring, debugging, and maintenance of RPA robots in some embodiments, which may provide automations for hyper-automation system 100.

In some embodiments, components of hyper-automation system 100, such as designer application(s) and/or an external rules engine, provide support for managing and enforcing governance policies for controlling various functionality provided by hyper-automation system 100. Governance is the ability for organizations to put policies in place to prevent users from developing automations (e.g., RPA robots) capable of taking actions that may harm the organization, such as violating the E.U. General Data Protection Regulation (GDPR), the U.S. Health Insurance Portability and Accountability Act (HIPAA), third party application terms of service, etc. Since developers may otherwise create automations that violate privacy laws, terms of service, etc. while performing their automations, some embodiments implement access control and governance restrictions at the robot and/or robot design application level. This may provide an added level of security and compliance into the automation process development pipeline in some embodiments by preventing developers from taking dependencies on unapproved software libraries that may either introduce security risks or work in a way that violates policies, regulations, privacy laws, and/or privacy policies. See U.S. Nonprovisional patent application Ser. No. 16/924,499, which is incorporated by reference for all it contains.

The management functionality may provide management, deployment, and optimization of automations across an organization. The management functionality may include orchestration, test management, AI functionality, and/or insights in some embodiments. Management functionality of hyper-automation system 100 may also act as an integration point with third-party solutions and applications for automation applications and/or RPA robots. The management capabilities of hyper-automation system 100 may include, but are not limited to, facilitating provisioning, deployment, configuration, queuing, monitoring, logging, and interconnectivity of RPA robots, among other things.

A conductor application, such as UiPath Orchestrator™ (which may be provided as part of the UiPath Automation Cloud™ in some embodiments, or on-premises, in VMs, in a private or public cloud, in a Linux™ VM, or as a cloud native single container suite via UiPath Automation Suite™), provides orchestration capabilities to deploy, monitor, optimize, scale, and ensure security of RPA robot deployments. A test suite (e.g., UiPath Test Suite™) may provide test management to monitor the quality of deployed automations. The test suite may facilitate test planning and execution, meeting of requirements, and defect traceability. The test suite may include comprehensive test reporting.

Analytics software (e.g., UiPath Insights™) may track, measure, and manage the performance of deployed automations. The analytics software may align automation operations with specific key performance indicators (KPIs) and strategic outcomes for an organization. The analytics software may present results in a dashboard format for better understanding by human users.

A data service (e.g., UiPath Data Service™) may be stored in database 140, for example, and bring data into a single, scalable, secure place with a drag-and-drop storage interface. Some embodiments may provide low-code or no-code data modeling and storage to automations while ensuring seamless access, enterprise-grade security, and scalability of the data. AI functionality may be provided by an AI center (e.g., UiPath AI Center™), which facilitates incorporation of AI/ML models into automations. Pre-built AI/ML models, model templates, and various deployment options may make such functionality accessible even to those who are not data scientists. Deployed automations (e.g., RPA robots) may call AI/ML models from the AI center, such as AI/ML models 132. Performance of the AI/ML models may be monitored, and be trained and improved using human-validated data, such as that provided by data review center 160. Human reviewers may provide labeled data to core hyper-automation system 120 via a review application 152 on computing systems 154. For instance, human reviewers may validate that predictions by AI/ML models 132 are accurate or provide corrections otherwise. This dynamic input may then be saved as training data for retraining AI/ML models 132, and may be stored in a database such as database 140, for example. The AI center may then schedule and execute training jobs to train the new versions of the AI/ML models using the training data. Both positive and negative examples may be stored and used for retraining of AI/ML models 132.

The engagement functionality engages humans and automations as one team for seamless collaboration on desired processes. Low-code applications may be built (e.g., via UiPath Apps™) to connect browser tabs and legacy software, even that lacking APIs in some embodiments. Applications may be created quickly using a web browser through a rich library of drag-and-drop controls, for instance. An application can be connected to a single automation or multiple automations.

An action center (e.g., UiPath Action Center™) provides a straightforward and efficient mechanism to hand off processes from automations to humans, and vice versa. Humans may provide approvals or escalations, make exceptions, etc. The automation may then perform the automatic functionality of a given workflow.

A local assistant may be provided as a launchpad for users to launch automations (e.g., UiPath Assistant™). This functionality may be provided in a tray provided by an operating system, for example, and may allow users to interact with RPA robots and RPA robot-powered applications on their computing systems. An interface may list automations approved for a given user and allow the user to run them. These may include ready-to-go automations from an automation marketplace, an internal automation store in an automation hub, etc. When automations run, they may run as a local instance in parallel with other processes on the computing system so users can use the computing system while the automation performs its actions. In certain embodiments, the assistant is integrated with the task capture functionality such that users can document their soon-to-be-automated processes from the assistant launchpad.

Chatbots (e.g., UiPath Chatbots™), social messaging applications, and/or voice commands may enable users to run automations. This may simplify access to information, tools, and resources users need in order to interact with customers or perform other activities. Conversations between people may be readily automated, as with other processes. Trigger RPA robots kicked off in this manner may perform operations such as checking an order status, posting data in a CRM, etc., potentially using plain language commands.

End-to-end measurement and government of an automation program at any scale may be provided by hyper-automation system 100 in some embodiments. Per the above, analytics may be employed to understand the performance of automations (e.g., via UiPath Insights™). Data modeling and analytics using any combination of available business metrics and operational insights may be used for various automated processes. Custom-designed and pre-built dashboards allow data to be visualized across desired metrics, new analytical insights to be discovered, performance indicators to be tracked, ROI to be discovered for automations, telemetry monitoring to be performed on user computing systems, errors and anomalies to be detected, and automations to be debugged. An automation management console (e.g., UiPath Automation Ops™) may be provided to manage automations throughout the automation lifecycle. An organization may govern how automations are built, what users can do with them, and which automations users can access.

Hyper-automation system 100 provides an iterative platform in some embodiments. Processes can be discovered, automations can be built, tested, and deployed, performance may be measured, use of the automations may readily be provided to users, feedback may be obtained, AI/ML models may be trained and retrained, and the process may repeat itself. This facilitates a more robust and effective suite of automations.

Figure 2:
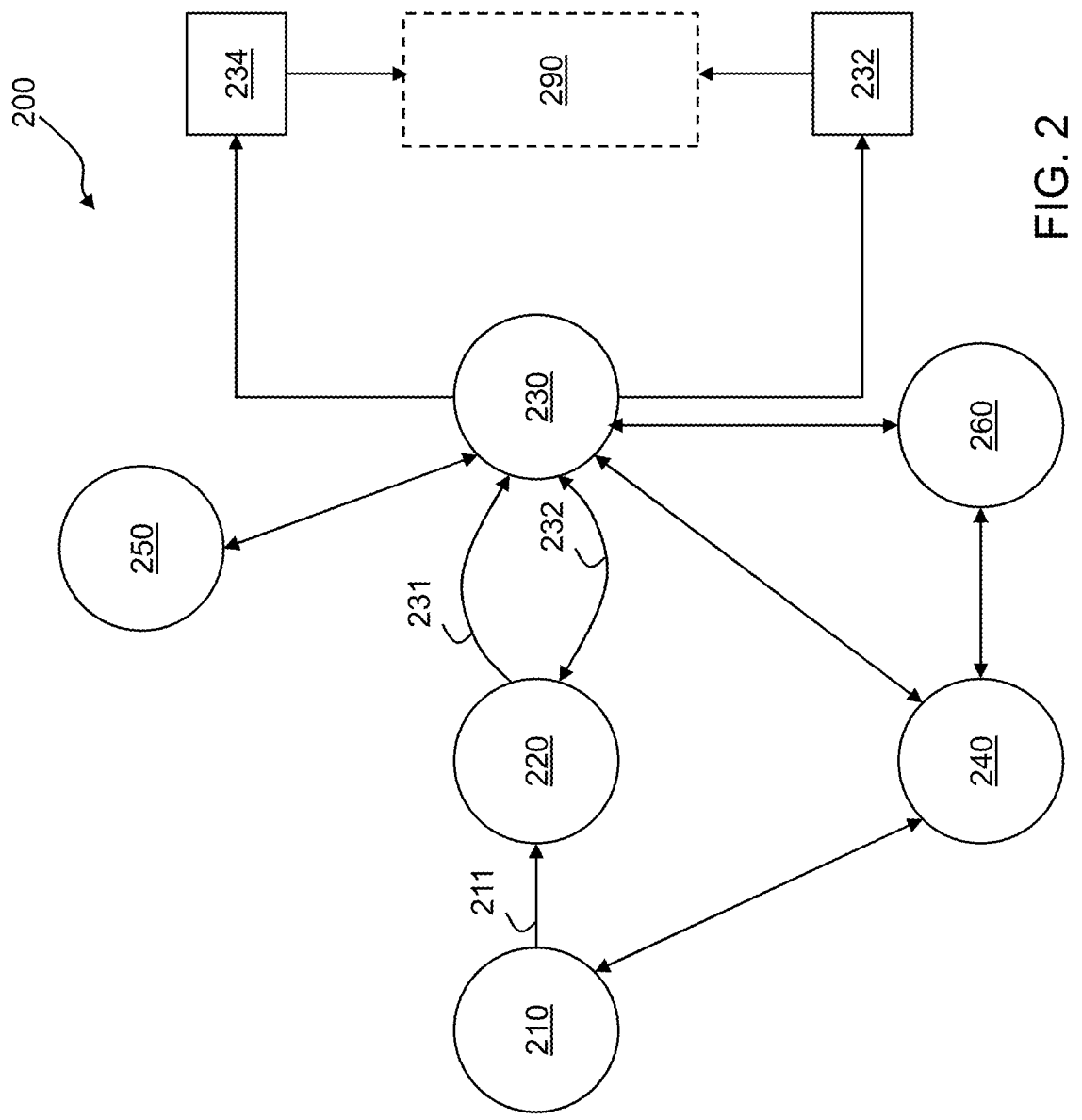
FIG. 2 depicts an architectural diagram illustrating an RPA system according to one or more embodiments.

FIG. 2 is an architectural diagram illustrating an RPA system 200, according to one or more embodiments. In some embodiments, RPA system 200 is part of hyper-automation system 100 of FIG. 1. RPA system 200 includes a designer 210 that allows a developer to design and implement workflows. Designer 210 may provide a solution for application integration, as well as automating third-party applications, administrative Information Technology (IT) tasks, and business IT processes. Designer 210 may facilitate development of an automation project, which is a graphical representation of a business process. Simply put, designer 210 facilitates the development and deployment (as represented by arrow 211) of workflows and robots. In some embodiments, designer 210 may be an application that runs on a user's desktop, an application that runs remotely in a VM, a web application, etc.

The automation project enables automation of rule-based processes by giving the developer control of the execution order and the relationship between a custom set of steps developed in a workflow, defined herein as "activities" per the above. One commercial example of an embodiment of designer 210 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 210, execution of business processes is orchestrated by conductor 220, which orchestrates one or more robots 230 that execute the workflows developed in designer 210. One commercial example of an embodiment of conductor 220 is UiPath Orchestrator™. Conductor 220 facilitates management of the creation, monitoring, and deployment of resources in an environment. Conductor 220 may act as an integration point with third-party solutions and applications. Per the above, in some embodiments, conductor 220 may be part of core hyper-automation system 120 of FIG. 1.

Conductor 220 may manage a fleet of robots 230, connecting and executing (as represented by arrow 231) robots 230 from a centralized point. Types of robots 230 that may be managed include, but are not limited to, attended robots 232, unattended robots 234, development robots (similar to unattended robots 234, but used for development and testing purposes), and nonproduction robots (similar to attended robots 232, but used for development and testing purposes).

Attended robots 232 are triggered by user events and operate alongside a human on the same computing system. Attended robots 232 may be used with conductor 220 for a centralized process deployment and logging medium. Attended robots 232 may help the human user accomplish various tasks, and may be triggered by user events. In some embodiments, processes cannot be started from conductor 220 on this type of robot and/or they cannot run under a locked screen. In certain embodiments, attended robots 232 can only be started from a robot tray or from a command prompt. Attended robots 232 should run under human supervision in some embodiments.

Unattended robots 234 run unattended in virtual environments and can automate many processes. Unattended robots 234 may be responsible for remote execution, monitoring, scheduling, and providing support for work queues. Debugging for all robot types may be run in designer 210 in some embodiments. Both attended and unattended robots may automate (as represented by dashed box 290) various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 220 may have various capabilities (as represented by arrow 232) including, but not limited to, provisioning, deployment, configuration, queueing, monitoring, logging, and/or providing interconnectivity. Provisioning may include creating and maintenance of connections between robots 230 and conductor 220 (e.g., a web application). Deployment may include assuring the correct delivery of package versions to assigned robots 230 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., a structured query language (SQL) or NoSQL database) and/or another storage mechanism (e.g., ElasticSearch®, which provides the ability to store and quickly query large datasets). Conductor 220 may provide interconnectivity by acting as the centralized point of communication for third-party solutions and/or applications.

Robots 230 are execution agents that implement workflows built in designer 210. One commercial example of some embodiments of robot(s) 230 is UiPath Robots™. In some embodiments, robots 230 install the Microsoft Windows® Service Control Manager (SCM)-managed service by default. As a result, such robots 230 can open interactive Windows® sessions under the local system account, and have the rights of a Windows® service.

In some embodiments, robots 230 can be installed in a user mode. For such robots 230, this means they have the same rights as the user under which a given robot 230 has been installed. This feature may also be available for High Density (HD) robots, which ensure full utilization of each machine at its maximum potential. In some embodiments, any type of robot 230 may be configured in an HD environment.

Robots 230 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 220 and the execution hosts (i.e., the computing systems on which robots 230 are executed). These services are trusted with and manage the credentials for robots 230. A console application is launched by the SCM under the local system.

User mode robot services in some embodiments manage and monitor Windows® sessions and act as a proxy between conductor 220 and the execution hosts. User mode robot services may be trusted with and manage the credentials for robots 230. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 230 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 210 may also be independent of browser zoom level in some embodiments. For applications that are DPI-unaware or intentionally marked as unaware, DPI may be disabled in some embodiments.

RPA system 200 in this embodiment is part of a hyper-automation system. Developers may use designer 210 to build and test RPA robots that utilize AI/ML models deployed in core hyper-automation system 240 (e.g., as part of an AI center thereof). Such RPA robots may send input for execution of the AI/ML model(s) and receive output therefrom via core hyper-automation system 240.

One or more of robots 230 may be listeners, as described above. These listeners may provide information to core hyper-automation system 240 regarding what users are doing when they use their computing systems. This information may then be used by core hyper-automation system for process mining, task mining, task capture, etc.

An assistant/chatbot 250 may be provided on user computing systems to allow users to launch RPA local robots. The assistant may be located in a system tray, for example. Chatbots may have a user interface so users can see text in the chatbot. Alternatively, chatbots may lack a user interface and run in the background, listening using the computing system's microphone for user speech.

In some embodiments, data labeling may be performed by a user of the computing system on which a robot is executing or on another computing system that the robot provides information to. For instance, if a robot calls an AI/ML model that performs CV on images for VM users, but the AI/ML model does not correctly identify a button on the screen, the user may draw a rectangle around the misidentified or non-identified component and potentially provide text with a correct identification. This information may be provided to core hyper-automation system 240 and then used later for training a new version of the AI/ML model.

Figure 3:
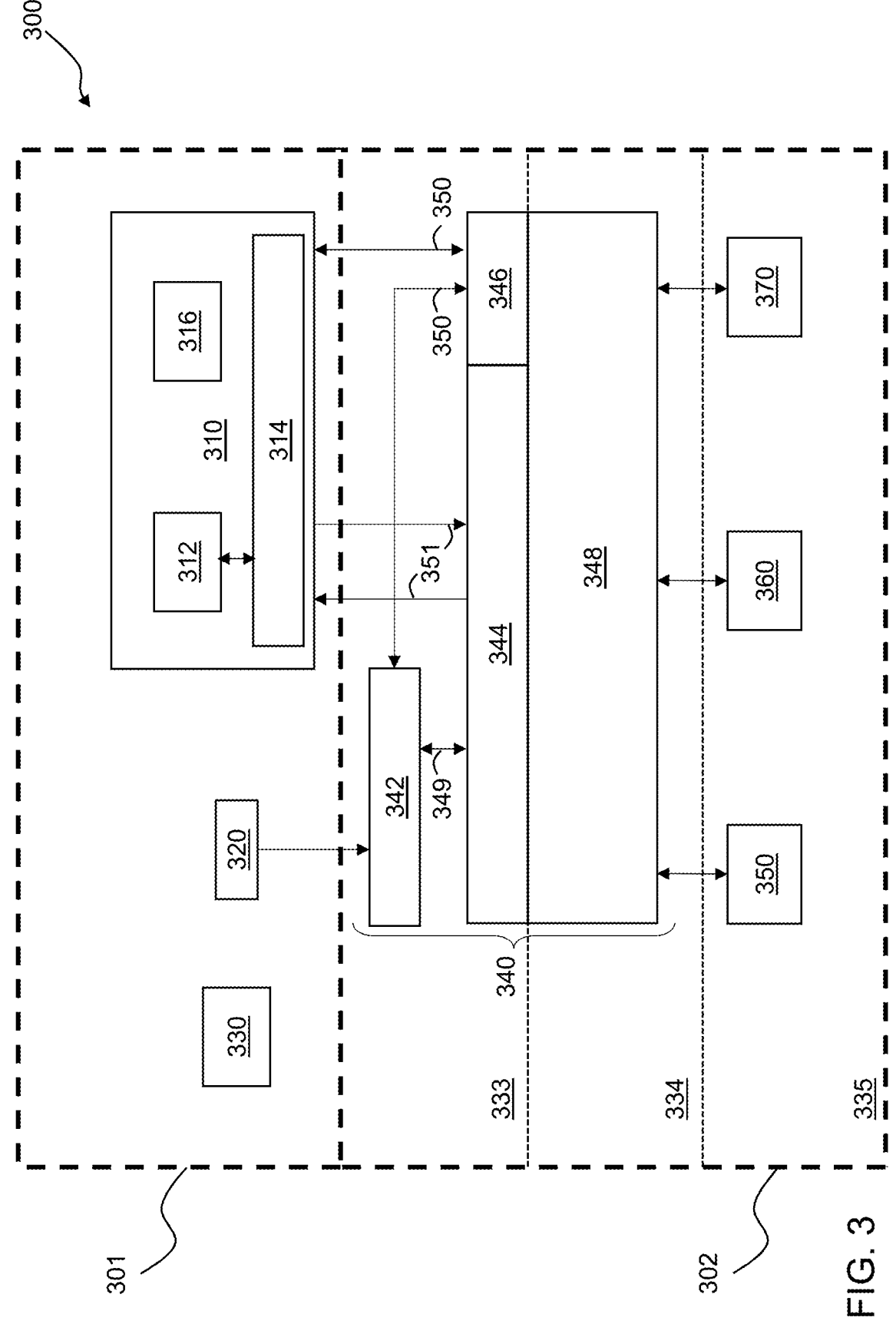
FIG. 3 depicts an architectural diagram illustrating a deployed RPA system, according to one or more embodiments.

FIG. 3 is an architectural diagram illustrating a deployed RPA system 300, according to one or more embodiments. In some embodiments, RPA system 300 may be a part of RPA system 200 of FIG. 2 and/or hyper-automation system 100 of FIG. 1. Deployed RPA system 300 may be a cloud-based system, an on-premises system, a desktop-based system that offers enterprise level, user level, or device level automation solutions for automation of different computing processes, etc.

It should be noted that a client side 301, a server side 302, or both, may include any desired number of computing systems without deviating from the scope of the one or more embodiments herein. On the client side 301, a robot application 310 includes executors 312, an agent 314, and a designer 316. However, in some embodiments, designer 316 may not be running on the same computing system as executors 312 and agent 314. Executors 312 are running processes. Several business projects may run simultaneously, as shown in FIG. 3. Agent 314 (e.g., a Windows® service) is the single point of contact for all executors 312 in this embodiment. All messages in this embodiment are logged into conductor 340, which processes them further via database server 355, an AI/ML server 360, an indexer server 370, or any combination thereof. As discussed above with respect to FIG. 2, executors 312 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 314 is also responsible for sending the status of the robot (e.g., periodically sending a "heartbeat" message indicating that the robot is still functioning) and downloading the required version of the package to be executed. The communication between agent 314 and conductor 340 is always initiated by agent 314 in some embodiments. In the notification scenario, agent 314 may open a WebSocket channel that is later used by conductor 330 to send commands to the robot (e.g., start, stop, etc.).

A listener 330 monitors and records data pertaining to user interactions with an attended computing system and/or operations of an unattended computing system on which listener 330 resides. Listener 330 may be an RPA robot, part of an operating system, a downloadable application for the respective computing system, or any other software and/or hardware without deviating from the scope of the one or more embodiments herein. Indeed, in some embodiments, the logic of the listener is implemented partially or completely via physical hardware.

On the server side 302, a presentation layer 333, a service layer 334, and a persistence layer 336 are included, as well as a conductor 340. The presentation layer 333 can include a web application 342, Open Data Protocol (OData) Representative State Transfer (REST) Application Programming Interface (API) endpoints 344, and notification and monitoring 346. The service layer 334 can include API implementation/business logic 348. The persistence layer 336 can include a database server 355, an AI/ML server 360, and an indexer server 370. For example, the conductor 340 includes the web application 342, the OData REST API endpoints 344, the notification and monitoring 346, and the API implementation/business logic 348. In some embodiments, most actions that a user performs in the interface of the conductor 340 (e.g., via browser 320) are performed by calling various APIs. Such actions may include, but are not limited to, starting jobs on robots, adding/removing data in queues, scheduling jobs to run unattended, etc. without deviating from the scope of the one or more embodiments herein. The web application 342 can be the visual layer of the server platform. In this embodiment, the web application 342 uses Hypertext Markup Language (HTML) and JavaScript (JS). However, any desired markup languages, script languages, or any other formats may be used without deviating from the scope of the one or more embodiments herein. The user interacts with web pages from the web application 342 via the browser 320 in this embodiment in order to perform various actions to control conductor 340. For instance, the user may create robot groups, assign packages to the robots, analyze logs per robot and/or per process, start and stop robots, etc.

In addition to web application 342, conductor 340 also includes service layer 334 that exposes OData REST API endpoints 344. However, other endpoints may be included without deviating from the scope of the one or more embodiments herein. The REST API is consumed by both web application 342 and agent 314. Agent 314 is the supervisor of one or more robots on the client computer in this embodiment.

The REST API in this embodiment includes configuration, logging, monitoring, and queueing functionality (represented by at least arrow 349). The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 340. Queueing REST endpoints may be responsible for queues and queue item management, such as adding data to a queue, obtaining a transaction from the queue, setting the status of a transaction, etc.

Monitoring REST endpoints may monitor web application 342 and agent 314. Notification and monitoring API 346 may be REST endpoints that are used for registering agent 314, delivering configuration settings to agent 314, and for sending/receiving notifications from the server and agent 314. Notification and monitoring API 346 may also use WebSocket communication in some embodiments. As shown in FIG. 3, one or more of the activities/actions described herein are represented by arrows 350 and 351.

The APIs in the service layer 334 may be accessed through configuration of an appropriate API access path in some embodiments, e.g., based on whether conductor 340 and an overall hyper-automation system have an on-premises deployment type or a cloud-based deployment type. APIs for conductor 340 may provide custom methods for querying stats about various entities registered in conductor 340. Each logical resource may be an OData entity in some embodiments. In such an entity, components such as the robot, process, queue, etc., may have properties, relationships, and operations. APIs of conductor 340 may be consumed by web application 342 and/or agents 314 in two ways in some embodiments: by getting the API access information from conductor 340, or by registering an external application to use the OAuth flow.

The persistence layer 336 includes a trio of servers in this embodiment—database server 355 (e.g., a SQL server), AI/ML server 360 (e.g., a server providing AI/ML model serving services, such as AI center functionality) and indexer server 370. Database server 355 in this embodiment stores the configurations of the robots, robot groups, associated processes, users, roles, schedules, etc. This information is managed through web application 342 in some embodiments. Database server 355 may manage queues and queue items. In some embodiments, database server 355 may store messages logged by the robots (in addition to or in lieu of indexer server 370). Database server 355 may also store process mining, task mining, and/or task capture-related data, received from listener 330 installed on the client side 301, for example. While no arrow is shown between listener 330 and database 355, it should be understood that listener 330 is able to communicate with database 355, and vice versa in some embodiments. This data may be stored in the form of PDDs, images, XAML files, etc. Listener 330 may be configured to intercept user actions, processes, tasks, and performance metrics on the respective computing system on which listener 330 resides. For example, listener 330 may record user actions (e.g., clicks, typed characters, locations, applications, active elements, times, etc.) on its respective computing system and then convert these into a suitable format to be provided to and stored in database server 355.

AI/ML server 360 facilitates incorporation of AI/ML models into automations. Pre-built AI/ML models, model templates, and various deployment options may make such functionality accessible even to those who are not data scientists. Deployed automations (e.g., RPA robots) may call AI/ML models from AI/ML server 360. Performance of the AI/ML models may be monitored, and be trained and improved using human-validated data. AI/ML server 360 may schedule and execute training jobs to train new versions of the AI/ML models.

AI/ML server 360 may store data pertaining to AI/ML models and ML packages for configuring various ML skills for a user at development time. An ML skill, as used herein, is a pre-built and trained ML model for a process, which may be used by an automation, for example. AI/ML server 460 may also store data pertaining to document understanding technologies and frameworks, algorithms and software packages for various AI/ML capabilities including, but not limited to, intent analysis, natural language processing (NLP), speech analysis, different types of AI/ML models, etc.

Indexer server 370, which is optional in some embodiments, stores and indexes the information logged by the robots. In certain embodiments, indexer server 370 may be disabled through configuration settings. In some embodiments, indexer server 370 uses ElasticSearch®, which is an open source project full-text search engine. Messages logged by robots (e.g., using activities like log message or write line) may be sent through the logging REST endpoint (s) to indexer server 370, where they are indexed for future utilization.

Figure 4:
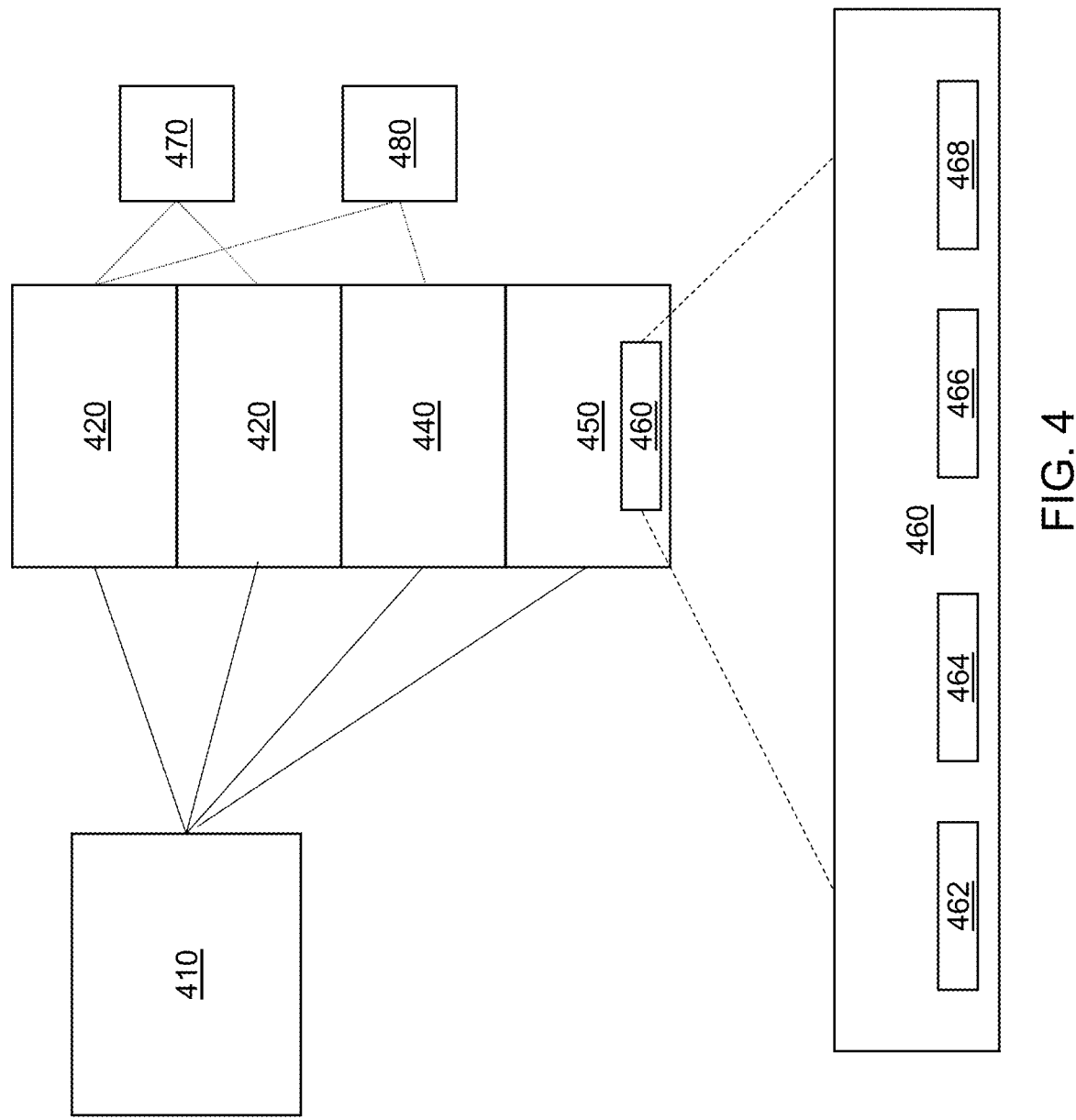
FIG. 4 depicts an architectural diagram illustrating relationships between a designer, activities, and drivers according to one or more embodiments.

FIG. 4 is an architectural diagram illustrating the relationship between a designer 410, activities 420, 430, 440, 450, drivers 460, APIs 470, and AI/ML models 480 according to one or more embodiments. As described herein, a developer uses the designer 410 to develop workflows that are executed by robots. The various types of activities may be displayed to the developer in some embodiments. Designer 410 may be local to the user's computing system or remote thereto (e.g., accessed via VM or a local web browser interacting with a remote web server). Workflows may include user-defined activities 420, API-driven activities 430, AI/ML activities 440, and/or UI automation activities 450. By way of example (as shown by the dotted lines), user-defined activities 420 and API-driven activities 440 interact with applications via their APIs. In turn, User-defined activities 420 and/or AI/ML activities 440 may call one or more AI/ML models 480 in some embodiments, which may be located locally to the computing system on which the robot is operating and/or remotely thereto.

Some embodiments are able to identify non-textual visual components in an image, which is called CV herein. CV may be performed at least in part by AI/ML model(s) 480. Some CV activities pertaining to such components may include, but are not limited to, extracting of text from segmented label data using OCR, fuzzy text matching, cropping of segmented label data using ML, comparison of extracted text in label data with ground truth data, etc. In some embodiments, there may be hundreds or even thousands of activities that may be implemented in user-defined activities 420. However, any number and/or type of activities may be used without deviating from the scope of the one or more embodiments herein.

UI automation activities 450 are a subset of special, lower-level activities that are written in lower-level code and facilitate interactions with the screen. UI automation activities 450 facilitate these interactions via drivers 460 that allow the robot to interact with the desired software. For instance, drivers 460 may include operating system (OS) drivers 462, browser drivers 464, VM drivers 466, enterprise application drivers 468, etc. One or more of AI/ML models 480 may be used by UI automation activities 450 in order to perform interactions with the computing system in some embodiments. In certain embodiments, AI/ML models 480 may augment drivers 460 or replace them completely. Indeed, in certain embodiments, drivers 460 are not included.

Drivers 460 may interact with the OS at a low level looking for hooks, monitoring for keys, etc. via OS drivers 462. Drivers 460 may facilitate integration with Chrome®, IE®, Citrix®, SAP®, etc. For instance, the "click" activity performs the same role in these different applications via drivers 460.

Figure 5:
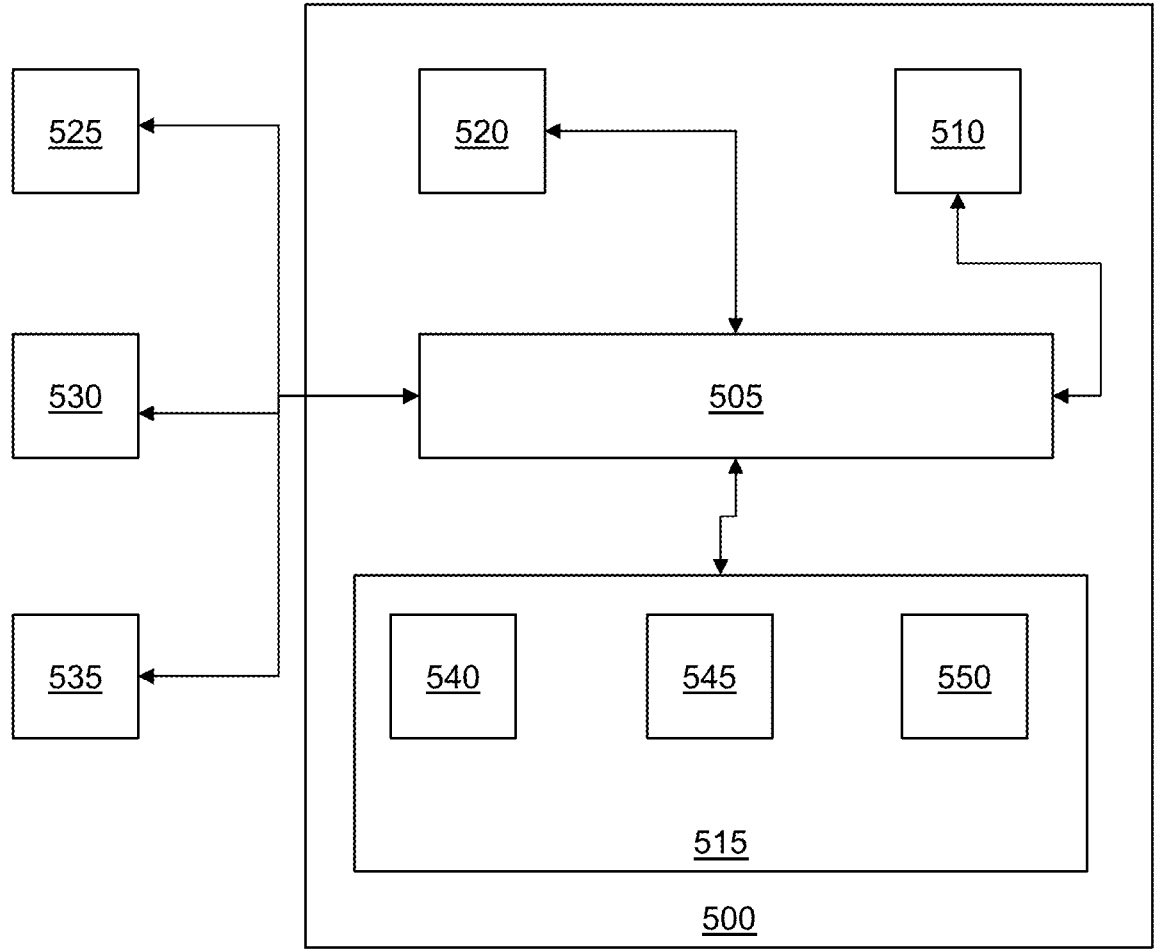
FIG. 5 depicts an architectural diagram illustrating a computing system according to one or more embodiments.

FIG. 5 is an architectural diagram illustrating a computing system 500 configured to provide pre-authorized access by RPA implemented a controller according to one or more embodiments. According to one or more embodiments, because RPAs are robots or machines that have identities, when a created job is create, that job is assigned to an RPA based on the identity. That is, the RPA is assigned a job by the controller because the controller knows information about the RPA. The controller (and sometimes with the identity service), in turn, checks the RPA, whether the RPA has the correct identity, whether the RPA was assigned that a particular job (e.g., the controller and the identity service each check configurations). For instance, the identity service can confirm a pre-authorized privilege for the controller, which includes requesting a token for any user identity for a set of any scopes. Then, the controller can confirm pre-authorized privileges for the job (e.g., user account indicates corresponding configuration). In these cases, the preauthorization is performed on a user identity so the controller and/or the RPA can impersonate a user corresponding to the user identity. Examples of confirming pre-authorized privileges include checking that configurations are correctly set and determining token requests (e.g., in some cases, when a job need to be executed, the controller looks at the job and determines which tokens are required for the job. Then, the controller goes to the identity service and gets pre-authorized tokens for the job).

In some embodiments, computing system 500 may be one or more of the computing systems depicted and/or described herein. In certain embodiments, computing system 500 may be part of a hyper-automation system, such as that shown in FIGS. 1 and 2. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G) New Radio (NR), any combination thereof, and/or any other currently existing or future-implemented communications standard and/or protocol without deviating from the scope of the one or more embodiments herein. In some embodiments, communication device 520 may include one or more antennas that are singular, arrayed, panels, phased, switched, beamforming, beamsteering, a combination thereof, and or any other antenna configuration without deviating from the scope of the one or more embodiments herein.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three-dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the one or more embodiments herein.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a module 545 (such as pre-authorized access by RPA implemented a controller) that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the one or more embodiments herein. Presenting the above-described functions as being performed by a "system" is not intended to limit the scope of embodiments herein in any way, but is intended to provide one example of the many embodiments. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the one or more embodiments herein.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the one or more embodiments herein.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
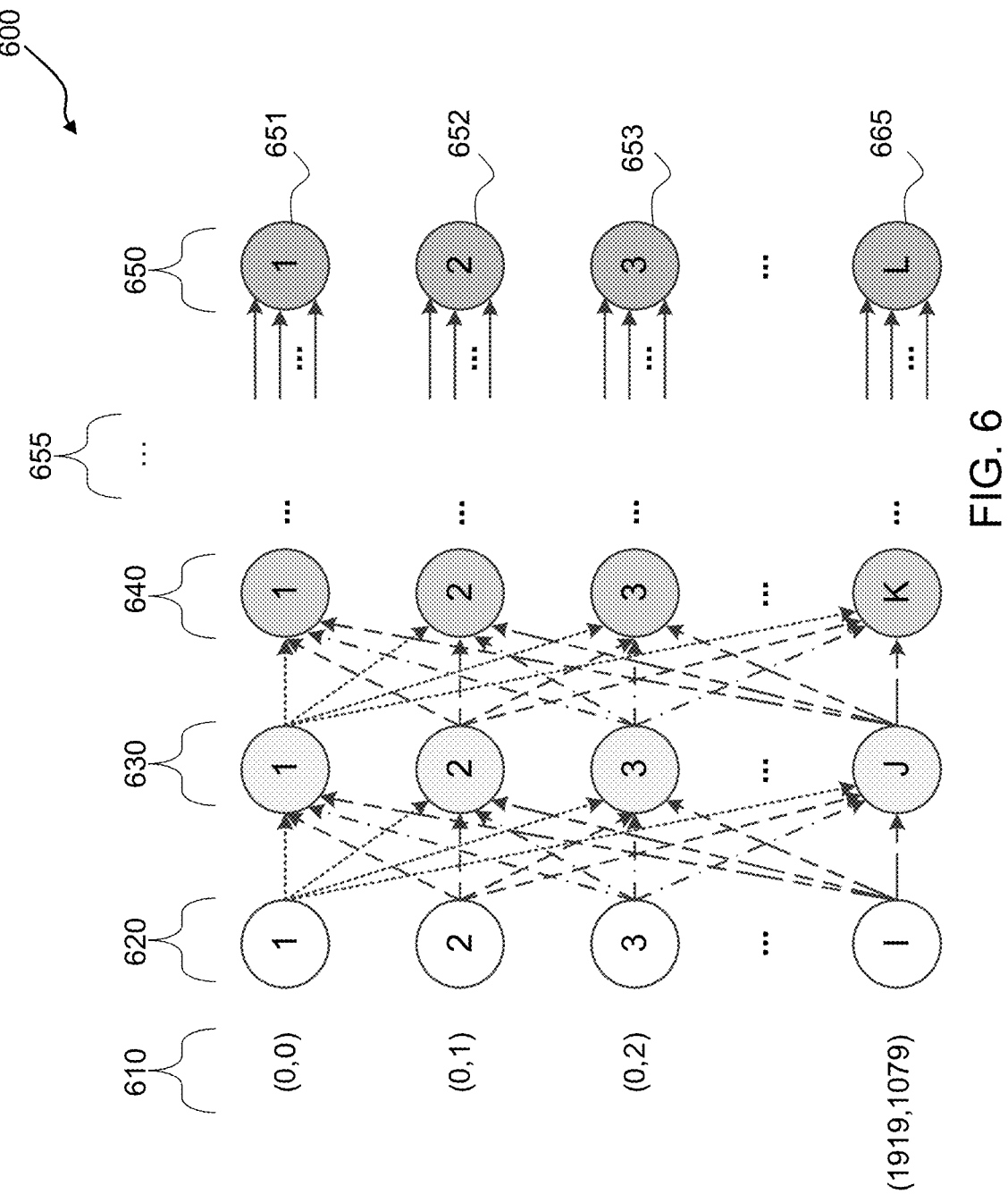
FIG. 6 illustrates an example of a neural network that has been trained to recognize graphical elements in an image according to one or more embodiments.

Various types of AI/ML models may be trained and deployed without deviating from the scope of the one or more embodiments herein. For instance, FIG. 6 illustrates an example of a neural network 600 that has been trained to recognize graphical elements in an image according to one or more embodiments. Here, neural network 600 receives pixels (as represented by column 610) of a screenshot image of a 1920×1080 screen as input for input "neurons" 1 to I of an input layer (as represented by column 620). In this case, I is 2,073,600, which is the total number of pixels in the screenshot image.

Neural network 600 also includes a number of hidden layers (as represented by column 630 and 640). Both DLNNs and shallow learning neural networks (SLNNs) usually have multiple layers, although SLNNs may only have one or two layers in some cases, and normally fewer than DLNNs. Typically, the neural network architecture includes the input layer, multiple intermediate layers (e.g., the hidden layers), and an output layer (as represented by column 650), as is the case in neural network 600.

A DLNN often has many layers (e.g., 10, 50, 200, etc.) and subsequent layers typically reuse features from previous layers to compute more complex, general functions. A SLNN, on the other hand, tends to have only a few layers and train relatively quickly since expert features are created from raw data samples in advance. However, feature extraction is laborious. DLNNs, on the other hand, usually do not require expert features, but tend to take longer to train and have more layers.

For both approaches, the layers are trained simultaneously on the training set, normally checking for overfitting on an isolated cross-validation set. Both techniques can yield excellent results, and there is considerable enthusiasm for both approaches. The optimal size, shape, and quantity of individual layers varies depending on the problem that is addressed by the respective neural network.

Returning to FIG. 6, pixels provided as the input layer are fed as inputs to the J neurons of hidden layer 1. While all pixels are fed to each neuron in this example, various architectures are possible that may be used individually or in combination including, but not limited to, feed forward networks, radial basis networks, deep feed forward networks, deep convolutional inverse graphics networks, convolutional neural networks, recurrent neural networks, artificial neural networks, long/short term memory networks, gated recurrent unit networks, generative adversarial networks, liquid state machines, auto encoders, variational auto encoders, denoising auto encoders, sparse auto encoders, extreme learning machines, echo state networks, Markov chains, Hopfield networks, Boltzmann machines, restricted Boltzmann machines, deep residual networks, Kohonen networks, deep belief networks, deep convolutional networks, support vector machines, neural Turing machines, or any other suitable type or combination of neural networks without deviating from the scope of the one or more embodiments herein.

Hidden layer 2 (630) receives inputs from hidden layer 1 (620), hidden layer 3 receives inputs from hidden layer 2 (630), and so on for all hidden layers until the last hidden layer (as represented by the ellipses 655) provides its outputs as inputs for the output layer. It should be noted that numbers of neurons I, J, K, and L are not necessarily equal, and thus, any desired number of layers may be used for a given layer of neural network 600 without deviating from the scope of the one or more embodiments herein. Indeed, in certain embodiments, the types of neurons in a given layer may not all be the same.

Neural network 600 is trained to assign a confidence score to graphical elements believed to have been found in the image. In order to reduce matches with unacceptably low likelihoods, only those results with a confidence score that meets or exceeds a confidence threshold may be provided in some embodiments. For instance, if the confidence threshold is 80%, outputs with confidence scores exceeding this amount may be used and the rest may be ignored. In this case, the output layer indicates that two text fields (as represented by outputs 661 and 662), a text label (as represented by output 663), and a submit button (as represented by output 665) were found. Neural network 600 may provide the locations, dimensions, images, and/or confidence scores for these elements without deviating from the scope of the one or more embodiments herein, which can be used subsequently by an RPA robot or another process that uses this output for a given purpose.

It should be noted that neural networks are probabilistic constructs that typically have a confidence score. This may be a score learned by the AI/ML model based on how often a similar input was correctly identified during training. For instance, text fields often have a rectangular shape and a white background. The neural network may learn to identify graphical elements with these characteristics with a high confidence. Some common types of confidence scores include a decimal number between 0 and 1 (which can be interpreted as a percentage of confidence), a number between negative co and positive co, or a set of expressions (e.g., "low," "medium," and "high"). Various post-processing calibration techniques may also be employed in an attempt to obtain a more accurate confidence score, such as temperature scaling, batch normalization, weight decay, negative log likelihood (NLL), etc.

"Neurons" in a neural network are mathematical functions that are typically based on the functioning of a biological neuron. Neurons receive weighted input and have a summation and an activation function that governs whether they pass output to the next layer. This activation function may be a nonlinear thresholded activity function where nothing happens if the value is below a threshold, but then the function linearly responds above the threshold (i.e., a rectified linear unit (ReLU) nonlinearity). Summation functions and ReLU functions are used in deep learning since real neurons can have approximately similar activity functions. Via linear transforms, information can be subtracted, added, etc. In essence, neurons act as gating functions that pass output to the next layer as governed by their underlying mathematical function. In some embodiments, different functions may be used for at least some neurons.

Figure 7:
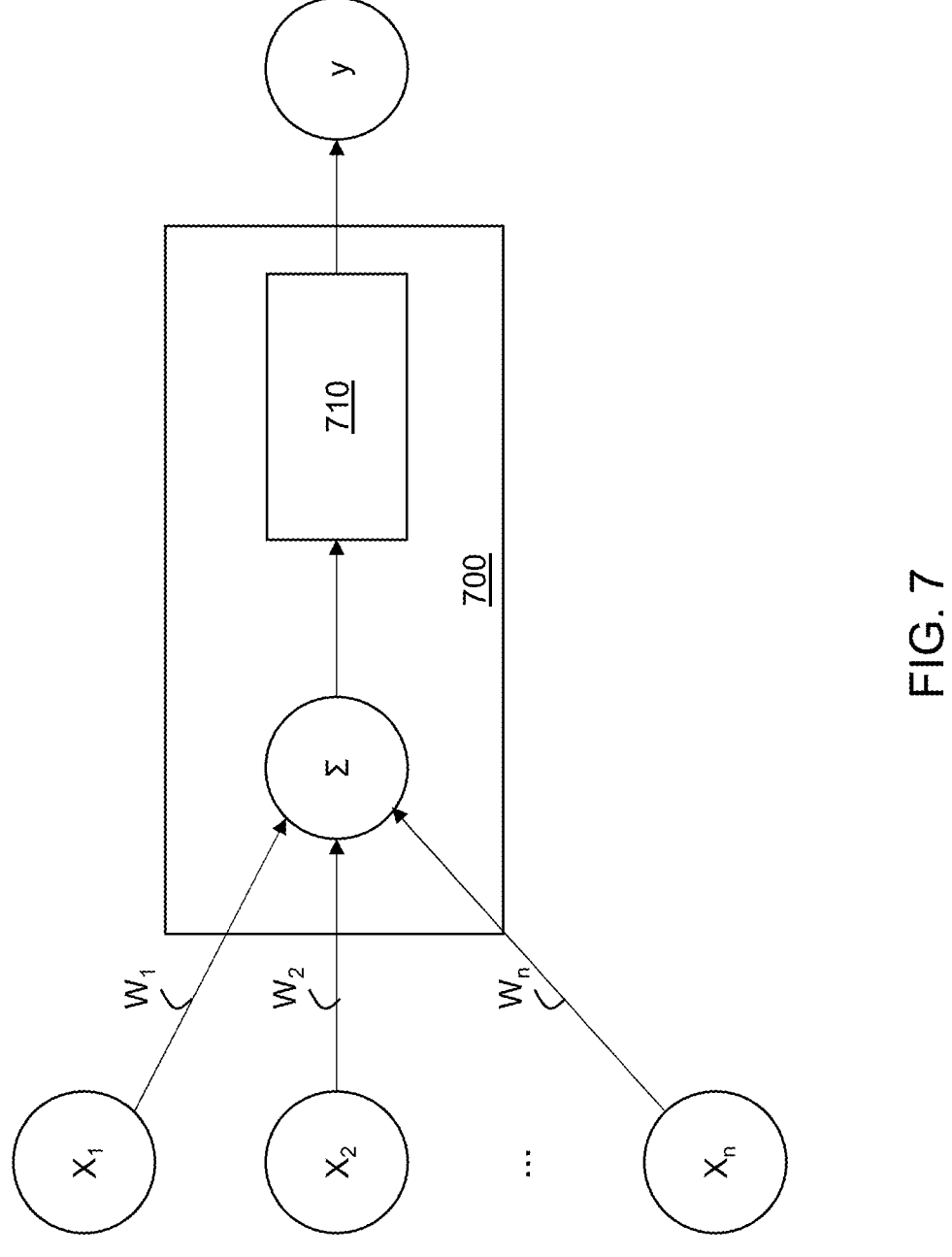
FIG. 7 illustrates an example of a neuron according to one or more embodiments.

An example of a neuron 700 is shown in FIG. 7. Inputs $x_1$, $x_2$, ..., $x_n$ from a preceding layer are assigned respective weights $w_1$, $w_2$, ..., $w_n$. Thus, the collective input from preceding neuron 1 is $w_1 x_1$. These weighted inputs are used for the neuron's summation function modified by a bias, such as:

$$\sum_{i=1}^{m} (w_i x_i) + \text{bias} \tag{1}$$

This summation is compared against an activation function $f(x)$ (as represented by block 710) to determine whether the neuron "fires". For instance, $f(x)$ may be given by:

$$f(x) = \begin{cases} 1 & \text{if } \sum wx + \text{bias} \geq 0 \\ 0 & \text{if } \sum wx + \text{bias} < 0 \end{cases} \tag{2}$$

The output y of neuron 700 may thus be given by:

$$y = f(x) \sum_{i=1}^{m} (w_i x_i) + \text{bias} \tag{3}$$

In this case, neuron 700 is a single-layer perceptron. However, any suitable neuron type or combination of neuron types may be used without deviating from the scope of the one or more embodiments herein. It should also be noted that the ranges of values of the weights and/or the output value(s) of the activation function may differ in some embodiments without deviating from the scope of the one or more embodiments herein.

The goal, or "reward function" is often employed, such as for this case the successful identification of graphical elements in the image. A reward function explores intermediate transitions and steps with both short-term and long-term rewards to guide the search of a state space and attempt to achieve a goal (e.g., successful identification of graphical elements, successful identification of a next sequence of activities for an RPA workflow, etc.).

During training, various labeled data (in this case, images) are fed through neural network 600. Successful identifications strengthen weights for inputs to neurons, whereas unsuccessful identifications weaken them. A cost function, such as mean square error (MSE) or gradient descent may be used to punish predictions that are slightly wrong much less than predictions that are very wrong. If the performance of the AI/ML model is not improving after a certain number of training iterations, a data scientist may modify the reward function, provide indications of where non-identified graphical elements are, provide corrections of misidentified graphical elements, etc.

Backpropagation is a technique for optimizing synaptic weights in a feedforward neural network. Backpropagation may be used to "pop the hood" on the hidden layers of the neural network to see how much of the loss every node is responsible for, and subsequently updating the weights in such a way that minimizes the loss by giving the nodes with higher error rates lower weights, and vice versa. In other words, backpropagation allows data scientists to repeatedly adjust the weights so as to minimize the difference between actual output and desired output.

The backpropagation algorithm is mathematically founded in optimization theory. In supervised learning, training data with a known output is passed through the neural network and error is computed with a cost function from known target output, which gives the error for backpropagation. Error is computed at the output, and this error is transformed into corrections for network weights that will minimize the error.

In the case of supervised learning, an example of backpropagation is provided below. A column vector input x is processed through a series of N nonlinear activity functions $f_i$ between each layer i=1, ..., N of the network, with the output at a given layer first multiplied by a synaptic matrix $W_i$, and with a bias vector $b_i$ added. The network output o, given by $$o = f_N(W_N f_{N-1}(W_{N-1} f_{N-2}(\ldots f_1(W_1 x + b_1) \ldots) + b_{N-1}) + b_N) \tag{4}$$

In some embodiments, o is compared with a target output t, resulting in an error $$E = \frac{1}{2} \|o - t\|^2,$$

which is desired to be minimized.

Optimization in the form of a gradient descent procedure may be used to minimize the error by modifying the synaptic weights $W_i$ for each layer. The gradient descent procedure requires the computation of the output o given an input x corresponding to a known target output t, and producing an error o−t. This global error is then propagated backwards giving local errors for weight updates with computations similar to, but not exactly the same as, those used for forward propagation. In particular, the backpropagation step typically requires an activity function of the form $p_j(n_j) = f_j'(n_j)$, where $n_j$ is the network activity at layer j (i.e., $n_j = W_j o_{j-1} + b_j$) where $o_j = f_j(n_j)$ and the apostrophe ' denotes the derivative of the activity function $f$.

The weight updates may be computed via the formulae:

$$d_j = \begin{cases} (o - t) \circ p_j(n_j), & j = N \\ W_{j+1}^T d_{j+1} \circ p_j(n_j), & j < N \end{cases} \tag{5}$$

$$\frac{\partial E}{\partial W_{j+1}} = d_{j+1}(o_j)^T \tag{6}$$

$$\frac{\partial E}{\partial b_{j+1}} = d_{j+1} \tag{7}$$

$$W_j^{new} = W_j^{old} - \eta \frac{\partial E}{\partial W_j} \tag{8}$$

$$b_j^{new} = b_j^{old} - \eta \frac{\partial E}{\partial b_j} \tag{9}$$

where $\circ$ denotes a Hadamard product (i.e., the element-wise product of two vectors), $^T$ denotes the matrix transpose, and $o_j$ denotes $f_j(W_j o_{j-1} + b_j)$, with $o_0 = x$. Here, the learning rate $\eta$ is chosen with respect to machine learning considerations. Below, $\eta$ is related to the neural Hebbian learning mechanism used in the neural implementation. Note that the synapses Wand b can be combined into one large synaptic matrix, where it is assumed that the input vector has appended ones, and extra columns representing the b synapses are subsumed to W.

The AI/ML model may be trained over multiple epochs until it reaches a good level of accuracy (e.g., 97% or better using an F2 or F4 threshold for detection and approximately 2,000 epochs). This accuracy level may be determined in some embodiments using an F1 score, an F2 score, an F4 score, or any other suitable technique without deviating from the scope of the one or more embodiments herein. Once trained on the training data, the AI/ML model may be tested on a set of evaluation data that the AI/ML model has not encountered before. This helps to ensure that the AI/ML model is not "over fit" such that it identifies graphical elements in the training data well, but does not generalize well to other images.

In some embodiments, it may not be known what accuracy level is possible for the AI/ML model to achieve. Accordingly, if the accuracy of the AI/ML model is starting to drop when analyzing the evaluation data (i.e., the model is performing well on the training data, but is starting to perform less well on the evaluation data), the AI/ML model may go through more epochs of training on the training data (and/or new training data). In some embodiments, the AI/ML model is only deployed if the accuracy reaches a certain level or if the accuracy of the trained AI/ML model is superior to an existing deployed AI/ML model.

In certain embodiments, a collection of trained AI/ML models may be used to accomplish a task, such as employing an AI/ML model for each type of graphical element of interest, employing an AI/ML model to perform OCR, deploying yet another AI/ML model to recognize proximity relationships between graphical elements, employing still another AI/ML model to generate an RPA workflow based on the outputs from the other AI/ML models, etc. This may collectively allow the AI/ML models to enable semantic automation, for instance.

Some embodiments may use transformer networks such as SentenceTransformers™, which is a Python™ framework for state-of-the-art sentence, text, and image embeddings. Such transformer networks learn associations of words and phrases that have both high scores and low scores. This trains the AI/ML model to determine what is close to the input and what is not, respectively. Rather than just using pairs of words/phrases, transformer networks may use the field length and field type, as well.

Figure 8:
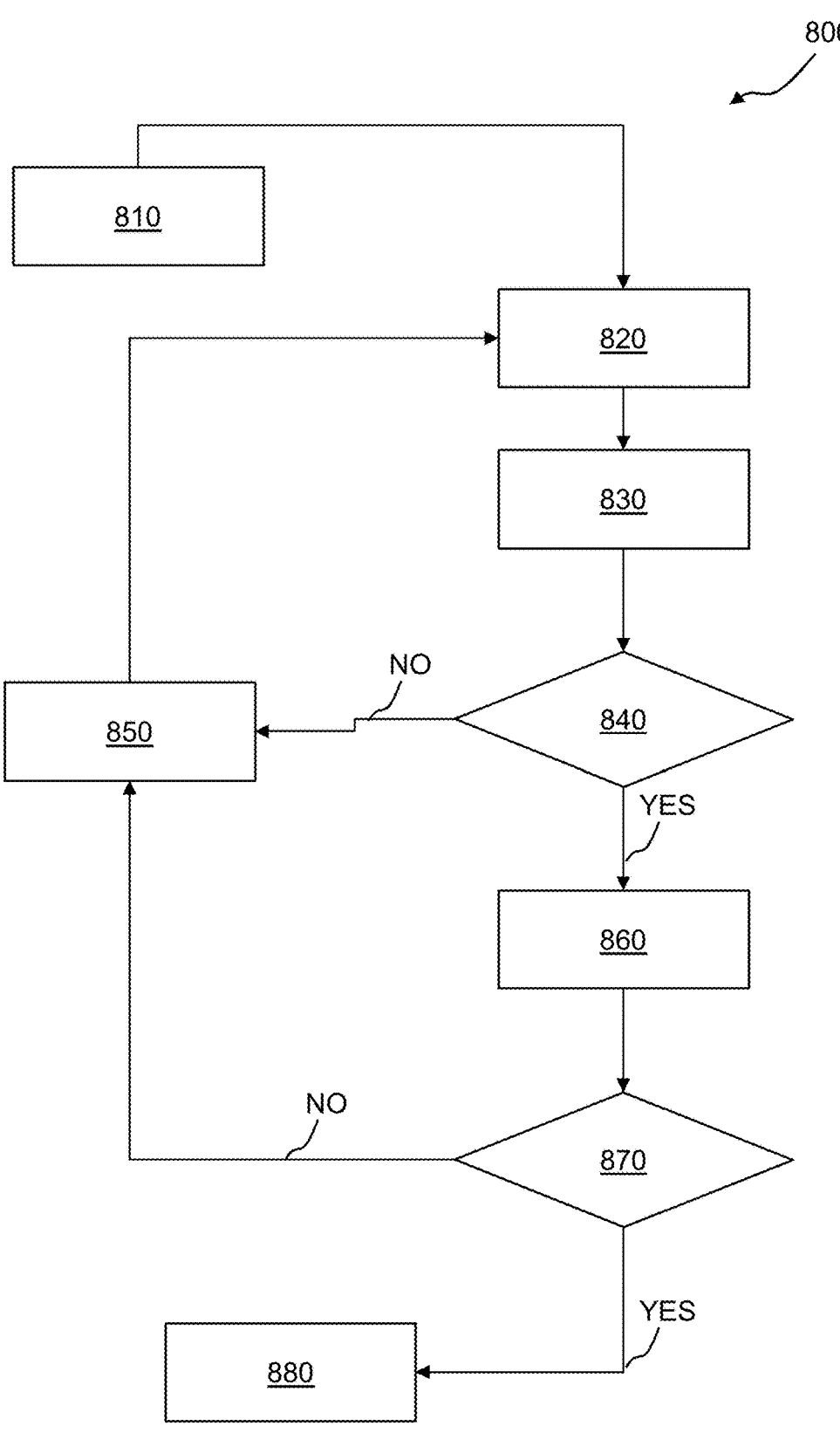
FIG. 8 depicts a flowchart illustrating a process for training AI/ML model(s) according to one or more embodiments.

FIG. 8 is a flowchart illustrating a process 800 for training AI/ML model(s) according to one or more embodiments. Note that the process 800 can also be applied to other UI learning operations, such as for NLP and chatbots. The process begins with training data, for example providing labeled data as illustrated in FIG. 8, such as labeled screens (e.g., with graphical elements and text identified), words and phrases, a "thesaurus" of semantic associations between words and phrases such that similar words and phrases for a given word or phrase can be identified, etc. at block 810. The nature of the training data that is provided will depend on the objective that the AI/ML model is intended to achieve. The AI/ML model is then trained over multiple epochs at block 820 and results are reviewed at block 830.

If the AI/ML model fails to meet a desired confidence threshold at decision block 840 (the process 800 proceeds according to the NO arrow), the training data is supplemented and/or the reward function is modified to help the AI/ML model achieve its objectives better at block 850 and the process returns to block 820. If the AI/ML model meets the confidence threshold at decision block 840 (the process 800 proceeds according to the YES arrow), the AI/ML model is tested on evaluation data at block 860 to ensure that the AI/ML model generalizes well and that the AI/ML model is not over fit with respect to the training data. The evaluation data may include screens, source data, etc. that the AI/ML model has not processed before. If the confidence threshold is met at decision block 870 for the evaluation data (the process 800 proceeds according to the Yes arrow), the AI/ML model is deployed at block 880. If not (the process 800 proceeds according to the NO arrow), the process returns to block 880 and the AI/ML model is trained further.

Figure 9:
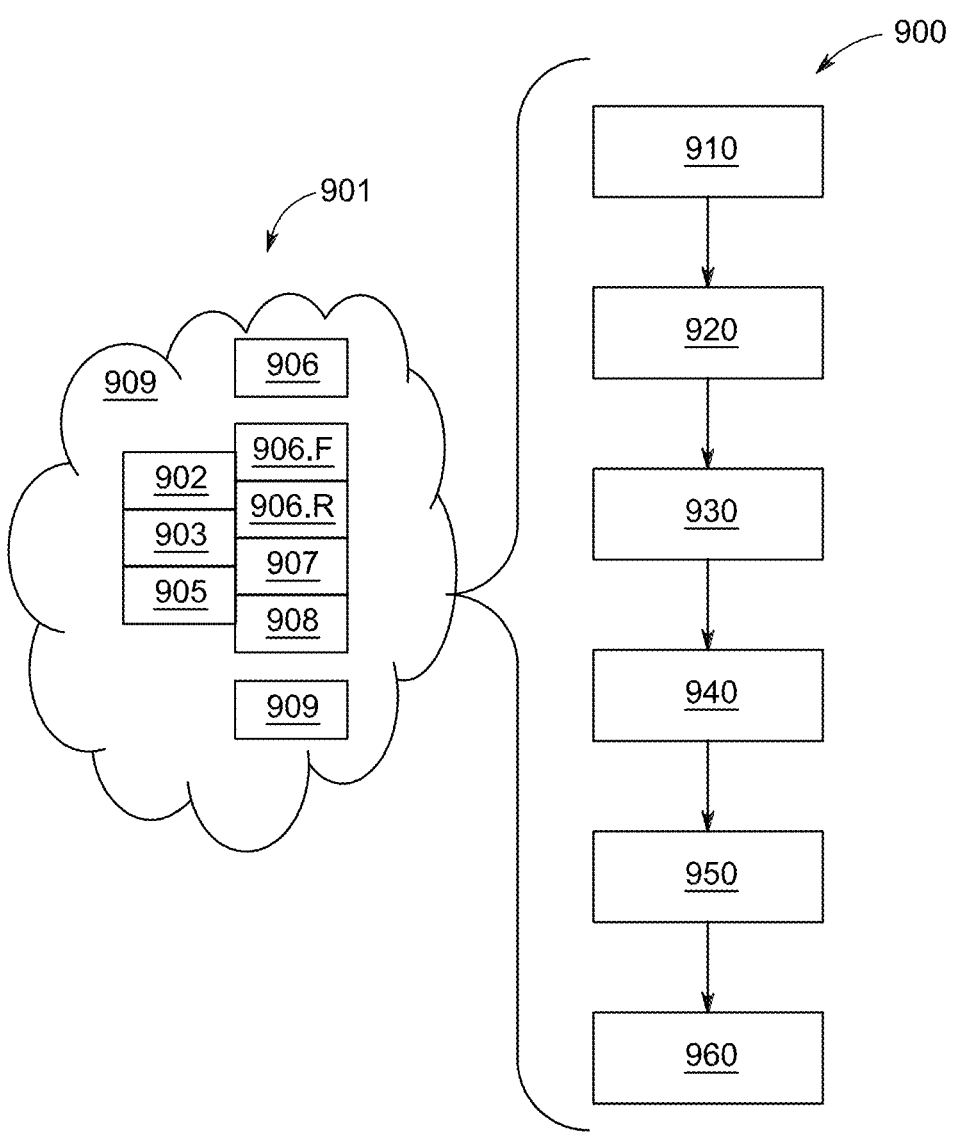
FIG. 9 depicts a process implemented by a system according to one or more embodiments.

FIG. 9 is a flowchart illustrating a process 900 according to one or more embodiments. The process 900 can be implemented by a system 901 (e.g., the computing system and/or the controller) implementing an RPA workflow engine 902 (referred to herein as the engine 902; e.g., the designer 210 of FIG. 2) and a HTTP recorder feature 903, which can be independent of or incorporated into the engine 902. The system 901 can further implement a custom integration service connector builder 905. The system 901 further includes a HTTP requests 906, filtered HTTP requests 906.F, recorded HTTP requests 906.R, HTTP request activities 907, sequences 908, and configuration inputs 909.

Generally, the system 901 can be a computing system, cloud system, and/or a controller that implements operations of the HTTP recorder feature 903 through the engine 902. Further, the engine 902 and/or the HTTP recorder feature 903 can be described as software within the system 901 that includes a framework of policies and technologies to monitors HTTP traffic (e.g., instead of capturing UI interactions) and generates a sequence of HTTP request activities.

According to one or more embodiments, the HTTP recorder feature 903 and the custom integration service connector builder 905 are software program features of the engine 902 that runs on top of and adds to a functionality of existing applications.

The process 900 illustrates example operations (e.g., HTTP recording) by the system 901. For example, the HTTP recorder feature 903 provide operations, such as converting the recorded HTTP requests 906 into the HTTP request activities 907 and generating the sequences 908 therefrom, that enable the one or more technical effects, advantages, and benefits of time saving and providing robust and scalable processes.

According to one or more embodiments, a test website is used to describe an example operation of the engine 902 and the HTTP recorder feature 903. The test website is an example and representative of any live website. Operations of the engine 902 and the HTTP recorder feature 903 are especially beneficial compared to UI Automation, when used in a situation like the following example website. The test website contains a work items section from where a set of separate pages can be accessed, each one containing data for a specific work item. An automation that extracts the details of each work item through UI automation will be slow and inefficient, compared to an automation that directly emulates and executes the HTTP requests generated by the browser to access this data. (as seen in FIGS. 10-12).

Figure 10:
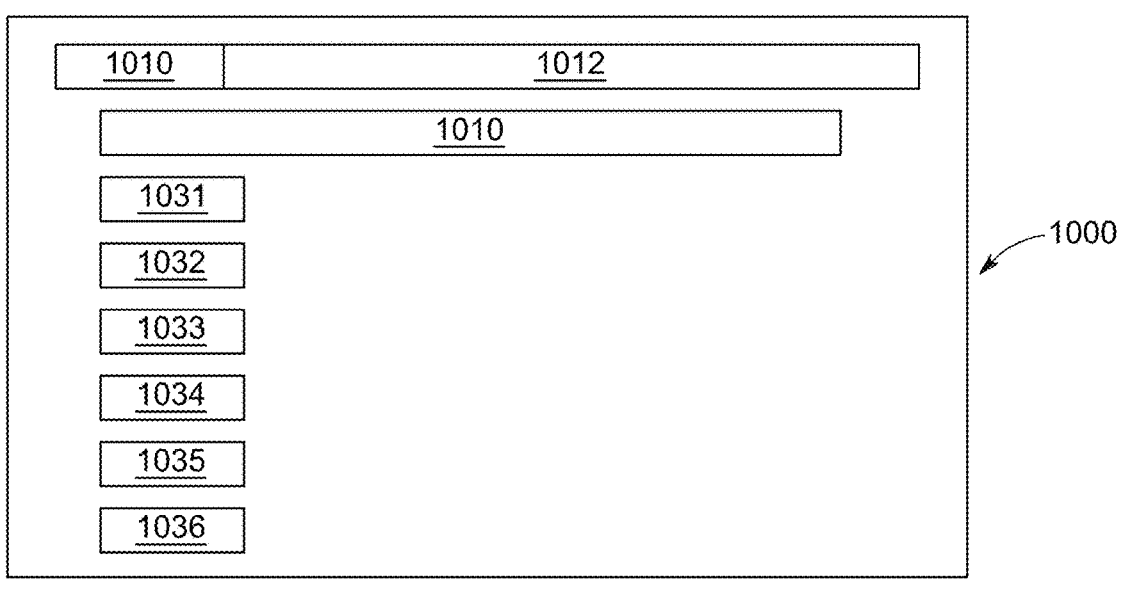
FIG. 10 depicts an example interface according to one or more embodiments.

FIG. 10 depicts an example interface 1000 according to one or more embodiments. The example interface 1000 illustrates a work items page in a test site comprising one or more interface items. The one or more interface items of the example interface 1000 include a home button 1010, a dashboard button 1012, and a welcome message 1014 (e.g., "Welcome [user email] to System 1"). The home button 1010 and the dashboard button 1012 can be located on a toolbar. One or more additional interface items can include menu items 1031-1036, any of which can be representative of user options, work items, accounts, checks, vendors, invoices, internal invoices, reports, students, health care, etc. A user can navigate the interface items of the example interface 1000. Upon clicking a work items options from the menu items 1031-1036, a work item interface can be generated.

Figure 11:
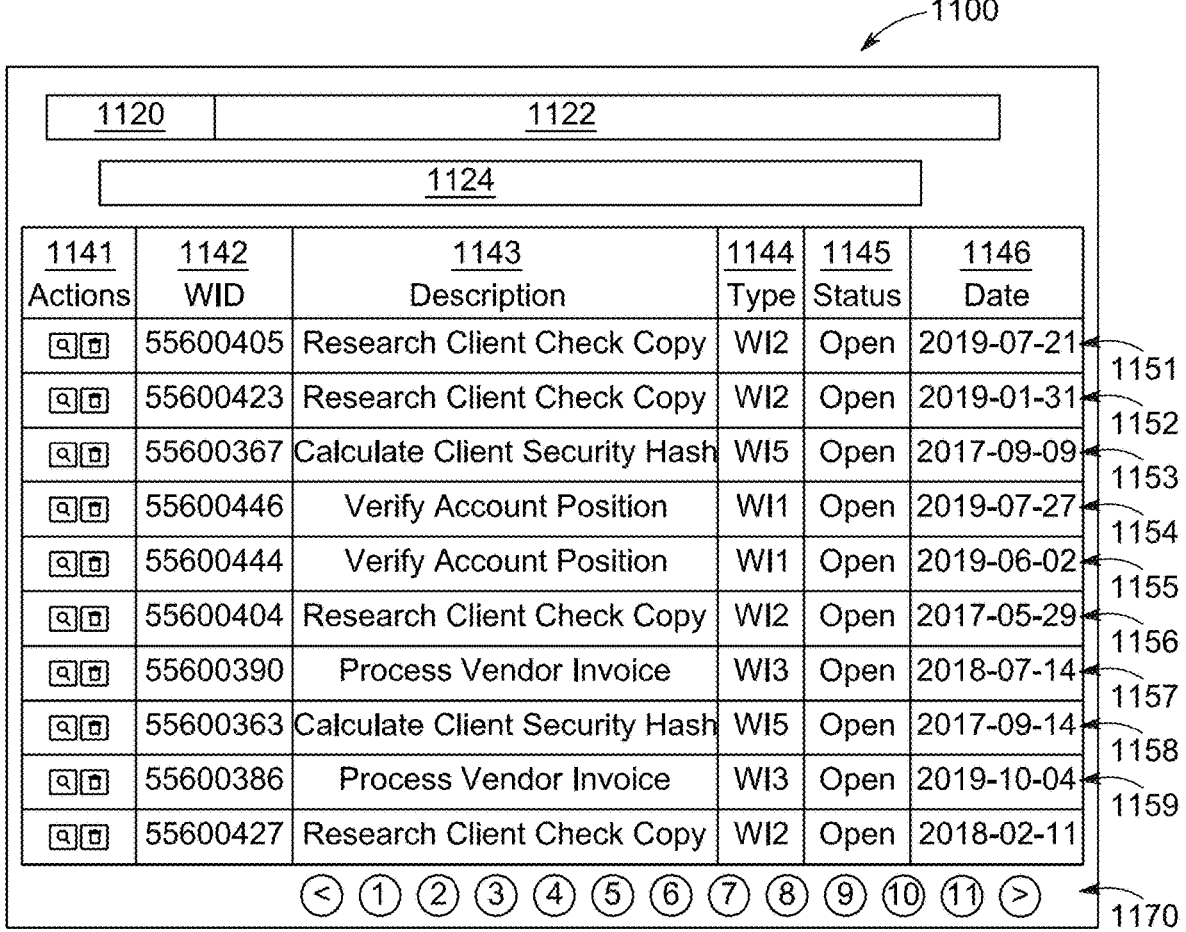
FIG. 11 depicts an example interface according to one or more embodiments.

FIG. 11 depicts an example interface 1100 according to one or more embodiments. The example interface 1100 shows the work item interface comprising one or more interface items. The example interface 1100 further provides available work items in the test site. The one or more interface items of the example interface 1100 include a home button 1120, a work items button 1122, and a search message 1124 (e.g., "Search Results: Please find below your work items. They need to be completed in the order specified by your manager."). The home button 1120 and the work items button 1122 can be located on a toolbar. The one or more interface items of the example interface 1100 include header items 1141-1146, any of which can be representative of actions, work item identification (WIID), descriptions, type, status, date, etc. One or more work items 1151-1159 can further be shown according to the header items 1141-1146. The one or more interface items of the example interface 1100 can include a navigating toolbar 1170 to move through one or more work items pages. For instance, hundreds (100s) of work items 1151-1159 are available from the work item interface. Upon clicking any work items 1151-1159, a work item details page can be generated.

Figures 12, 13, 14:
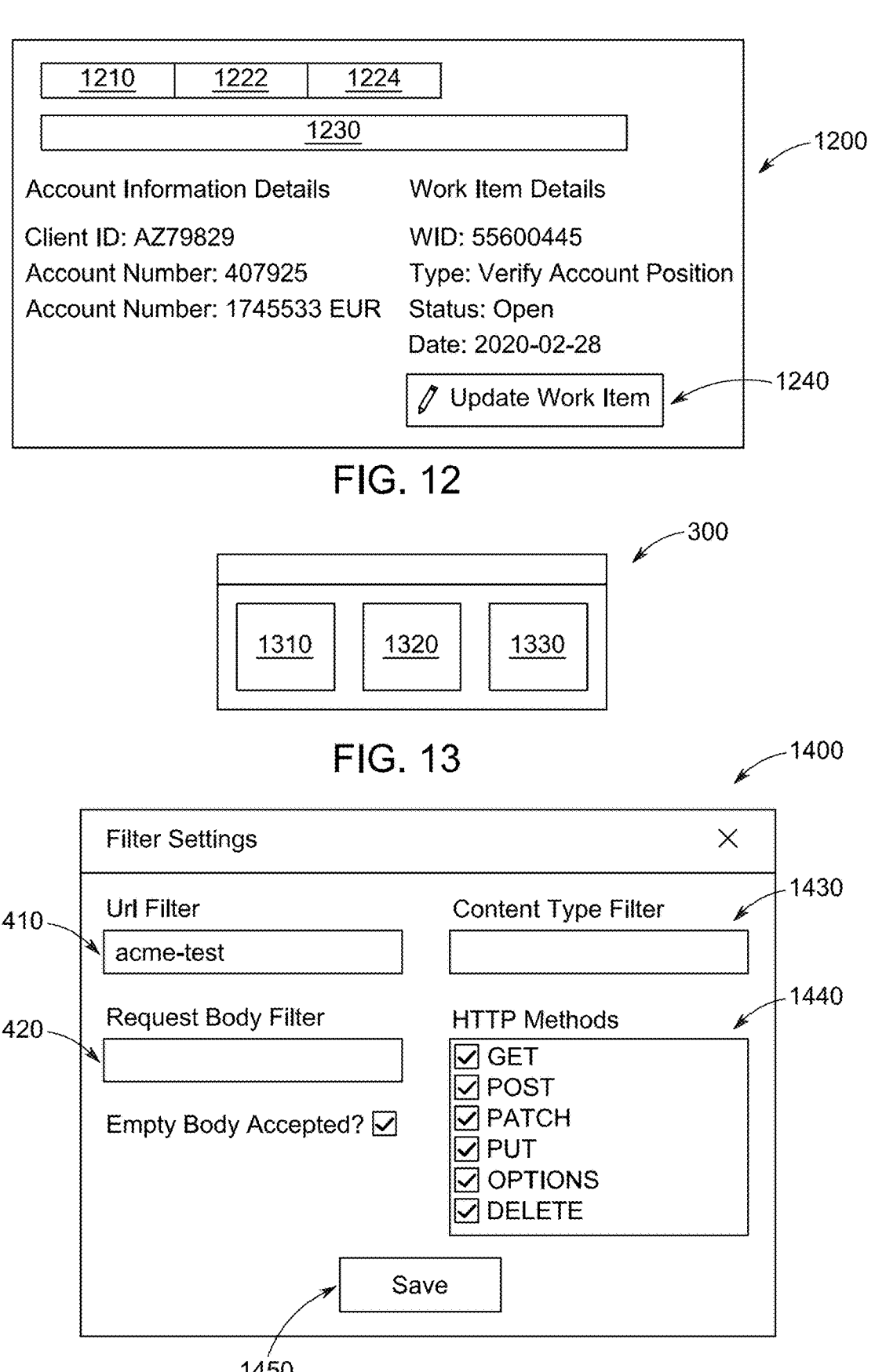
FIG. 12 depicts an example interface according to one or more embodiments.
FIG. 13 depicts an example interface according to one or more embodiments.
FIG. 14 depicts an example interface according to one or more embodiments.

FIG. 12 depicts an example interface 1200 according to one or more embodiments. The example interface 1200 shows a work item details page that provides details for a clicked/selected work item. The one or more interface items of the example interface 1200 includes a home button 1210, a work items button 1222, and a work items details button 1224 (each of which can be located on a toolbar). The one or more interface items of the example interface 1200 include a title bar 1230, which displays a name of the clicked/selected work item. Under the title bar 1230, details of the clicked/selected work item are provided, along with an update work item button 1240. As discussed herein, a problem with conventional UI automations is an extreme volume of time that conventional UI automations consume when navigating to all the work item details pages (e.g., via the navigating toolbar 1170), opening one or more work items (e.g., clicking each of the hundreds (100s) of work items 1151-1159), and extracting each one of the one or more work items. As discussed herein, operations of the engine 902 and the HTTP recorder feature 903 (e.g., as shown in the process 900) are in contrast to and an improvement upon the conventional operations of a test website (e.g., and in turn any live website).

The process 900 of FIG. 9 begins at block 910, where the engine 902 and the HTTP recorder feature 903 launches. According to one or more embodiments, the engine 902 operates to launch the HTTP recorder feature 903. For example, the engine 902 operates to launch the HTTP recorder feature 903 with respect to a specific page (e.g., the test page or any live website) to capture HTTP requests by loading a recorder interface (e.g., a pop-up menu or toolbar of the HTTP recorder feature 903).

FIG. 13 depicts an example interface 1300 of the recorder interface according to one or more embodiments. One or more interface items of the example interface 1300 can include a Save & Exit icon 1310, a Record icon 1320, and a Filter icon 1330. In an example operation, a selection of the Filter icon 1330 can generate a pop-up filter menu. FIG. 14 depicts an example interface 1400 of the pop-up filter menu according to one or more embodiments. One or more interface items of the example interface 1400 can include a uniform resource locator (URL) filter 1410, a request body filter 1420, a content text filter 1430, and a HTTP methods filter 1440. Utilizing the example interface 1400, the HTTP recorder feature 903 can be configured with one or more filters that screen specific HTTP requests related to the specific page. The one or more configured filters can be saved by a selection of a save button 1450.

At block 920, the engine 902 and the HTTP recorder feature 903 record HTTP requests. According to one or more embodiments, the engine 902 and the HTTP recorder feature 903 operate to record the HTTP requests according to the one or more filters set in the pop-up filter menu. Examples of the HTTP requests that are being recorded can include, but are not limited to, performing logins, navigating to work items, navigating work item details, and updating work items.

Figure 15:
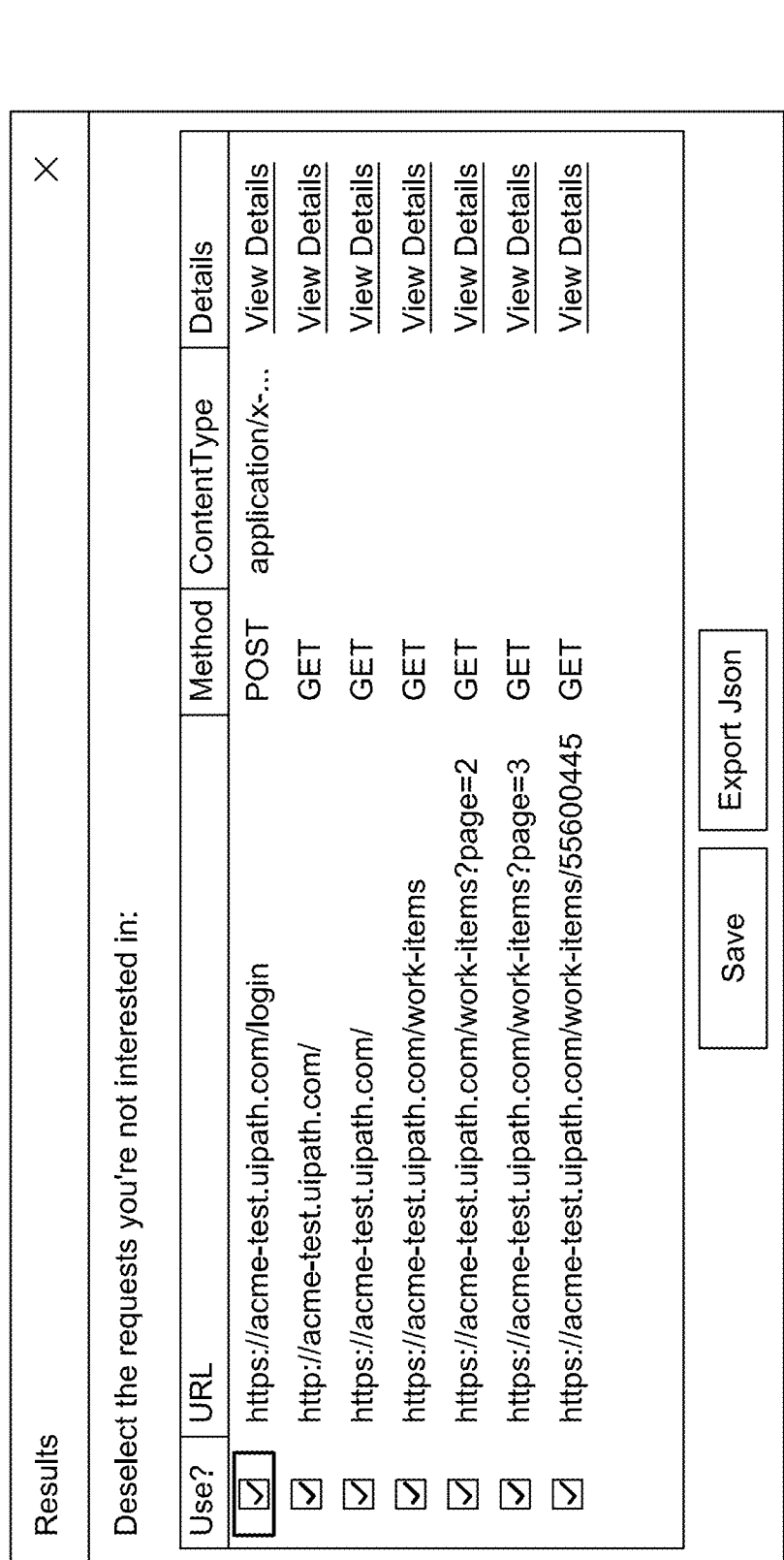
FIG. 15 depicts an example interface according to one or more embodiments.
Figure 16:
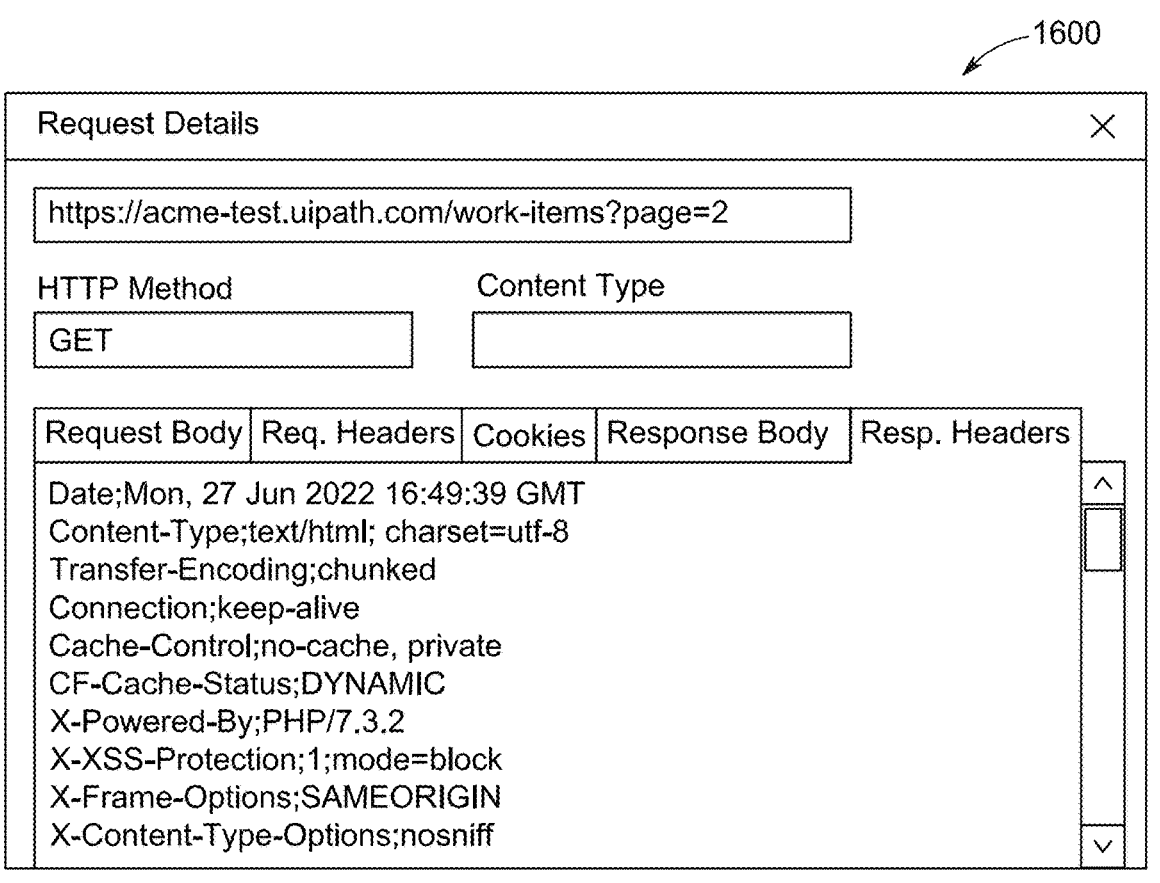
FIG. 16 depicts an example interface according to one or more embodiments.

At block 930, the engine 902 and the HTTP recorder feature 903 stop recording HTTP requests. According to one or more embodiments, the engine 902 and the HTTP recorder feature 903 can receive a stop recording indication through interactions with the Save & Exit icon 1310 of FIG. 13. Upon clicking the Save & Exit icon 1310, the HTTP recorder feature 903 stops all recording, saves all HTTP requests (e.g., as the recorded HTTP requests), and provides a viewing interface to provide the recorded HTTP requests. The recorded HTTP requests can be saved in a memory utilized by the HTTP recorder feature 903. The viewing interface can automatically generate after the Save & Exit icon 1310 is selected. The viewing interface can be a pop-up interface. The viewing interface can provide a list of the recorded HTTP requests. The engine 902 and the HTTP recorder feature 903 can further automatically generate a view for showing the captured UI actions, as seen in FIGS. 15-16. FIG. 15 depicts an example interface 1500 of the viewing interface according to one or more embodiments. The example interface 1500 shows to a user, for each request, all the details (e.g., such as header, response body, etc.). Further, the engine 902 and the HTTP recorder feature 903 enable detection of the HTTP requests that are not of interest. By way of example, a user can save the HTTP requests as a Json file or as a sequence of activities that is viewable and editable in the engine 902. FIG. 16 depicts an example interface 1600 in the HTTP recorder feature 903 that displays the details of an HTTP request and response message thereto. The example interface 1600 displays an HTTP endpoint, an HTTP method, a request body, a request header, a response body, a response header, and cookies. In the example interface 1600, HTTP Headers of the response message are displayed in a multi-line textbox, each header occupying one row.

Figure 17:
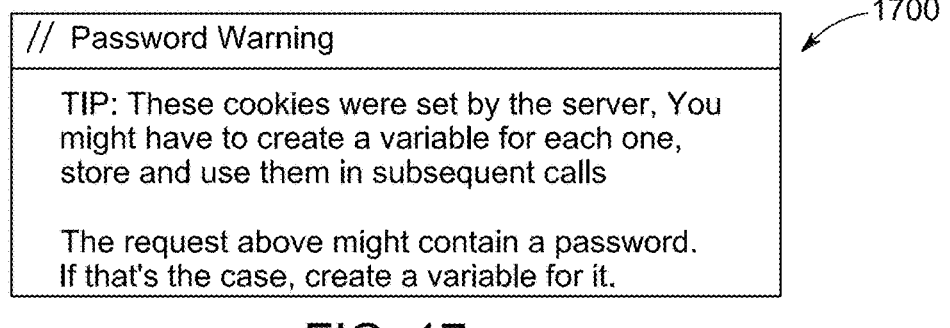
FIG. 17 depicts an example interface according to one or more embodiments.
Figure 18:
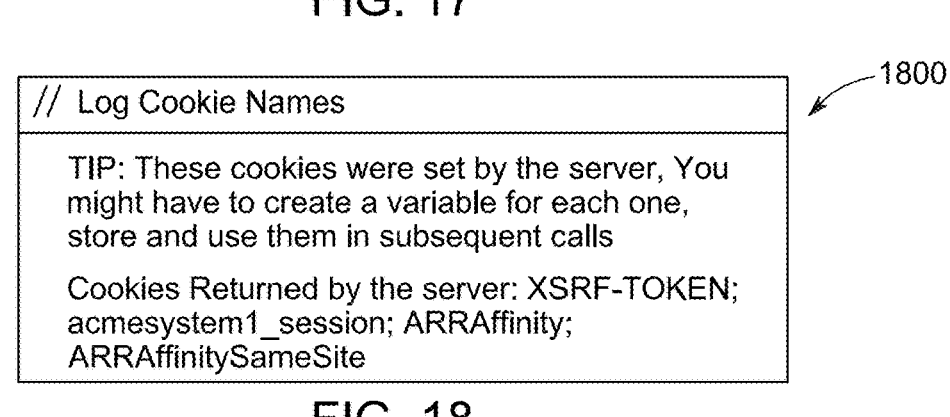
FIG. 18 depicts an example interface according to one or more embodiments.

At block 940, the engine 902 and the HTTP recorder feature 903 convert the recorded HTTP requests. According to one or more embodiments, the engine 902 and the HTTP recorder feature 903 can convert the recorded HTTP requests into HTTP activities. For example, all the recorded HTTP requests are converted into the HTTP request activities. By way of example, the HTTP recorder feature 903 convert the recorded HTTP requests from one or more .NET Objects of type cached HTTP request to a collection of one or more .NET Objects (e.g., activities) of type HTTP client or comment. The collection of the one or more .NET Objects is then passed to the engine 902, which inserts the collection into a workflow that is opened at that time. By way of another example, the Json file can be imported to a connection builder to create a custom connector (i.e., the requests will be serialized in a format accepted by the engine 902 or a custom connector builder of the engine 902). FIG. 17 depicts an example interface 1700 according to one or more embodiments. The example interface 1700 provides comment activity that indicates that a captured request contains a password. The comment activity assist users in adjusting code before consumption. FIG. 18 depicts an example interface 1800 according to one or more embodiments. The example interface 1800 provides comment activity that indicates that a captured request is returning cookies that can be used by subsequent requests. The comment activity assist users in adjusting code before consumption.

Figure 19:
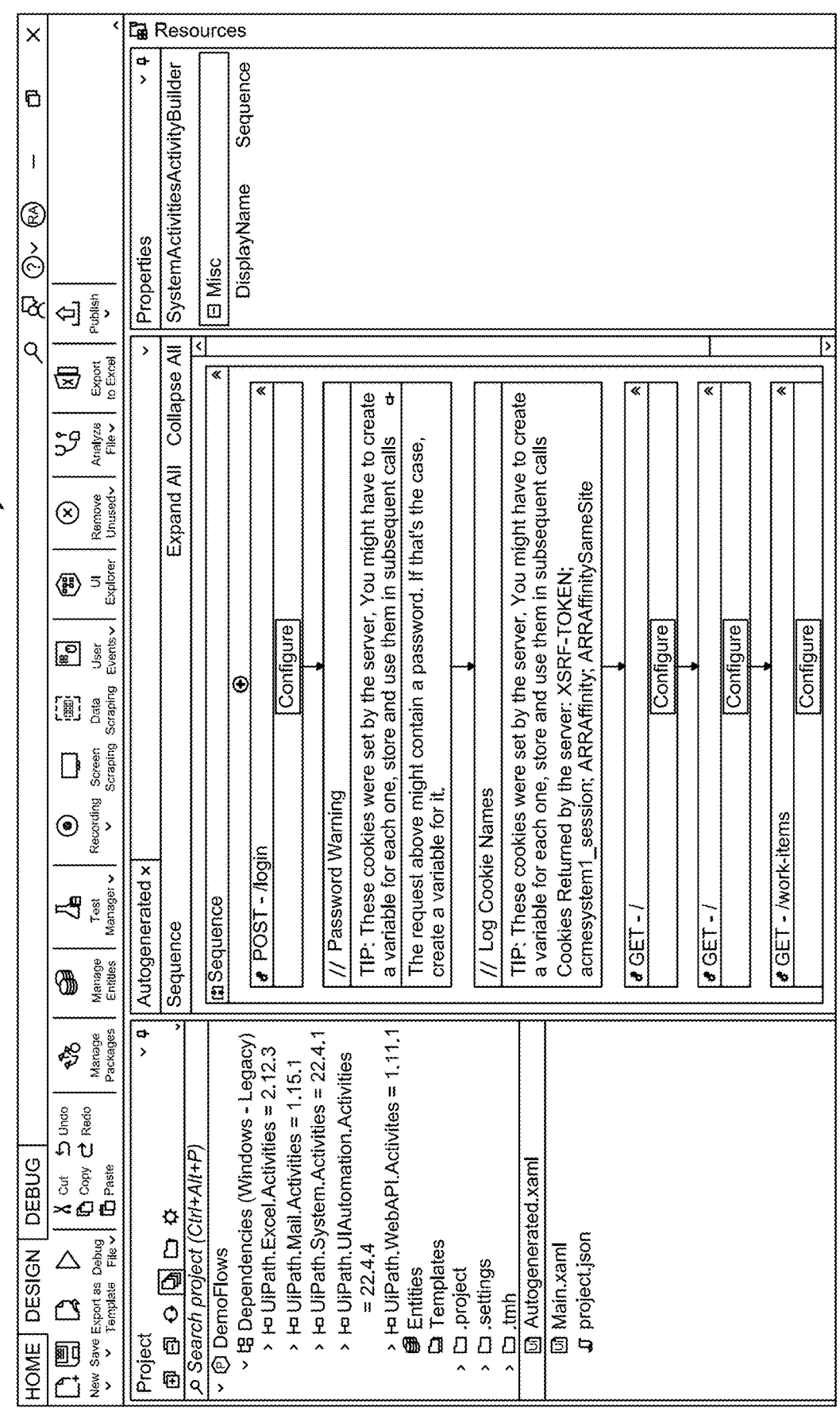
FIG. 19 depicts an example interface according to one or more embodiments.

At block 960, the engine 902 and the HTTP recorder feature 903 generate a sequence. According to one or more embodiments, the engine 902 and the HTTP recorder feature 903 can generate the sequence from the HTTP activities. For example, the engine 902 can further provide the sequence for further configuration, such as per a user need, and for executing a workflow. That is, a sequence of HTTP request activities is generated in the engine 902, where only minimal configurations is required to execute the workflow. According to one or more embodiments, a minimal configuration includes when generated activities require only hardcoded data parametrized by a user, in view of the engine 902 providing HTTP Endpoints, HTTP Verbs, headers, cookies, etc. (as captured) to enable make the parameterizing easier than building from scratch. For example, using the HTTP request activities sequence to create a loop to extract work item details for all the available work items and writing them into a file. In addition, tips for each activity are also provided. FIG. 19 depicts an example interface 1900 according to one or more embodiments. The example interface 1900 provides comment activity that indicates that a captured request is returning cookies and names thereof. The comment activity assist users in adjusting code before consumption.

According to one or more embodiments, a method is provided. The method is implemented by a robotic process automation workflow designer application that includes a hypertext transfer protocol recorder feature. The robotic process automation workflow designer application is embodied in software stored on at least one memory and executed by at least one processor. The method includes filtering hypertext transfer protocol requests to provide filtered hypertext transfer protocol requests. The method includes recording the filtered hypertext transfer protocol request to provide recorded hypertext transfer protocol requests. The method includes converting the recorded hypertext transfer protocol requests into hypertext transfer protocol request activities. The method includes generating a sequence from the hypertext transfer protocol request activities.

According to one or more embodiments or any of the method embodiments herein, the robotic process automation workflow designer application can operate to launch the hypertext transfer protocol recorder feature.

According to one or more embodiments or any of the method embodiments herein, the robotic process automation workflow designer application can receive one or more configuration inputs that modify the sequence.

According to one or more embodiments or any of the method embodiments herein, the robotic process automation workflow designer application can include an custom integration service connector builder configured to create custom connections from the recorded hypertext transfer protocol requests after importing.

According to one or more embodiments or any of the method embodiments herein, the robotic process automation workflow designer application can map between display values and hypertext transfer protocol response to automatically generate a user interface view for the robotic process automation workflow designer application.

According to one or more embodiments or any of the method embodiments herein, the recorded hypertext transfer protocol requests can include .NET objects of type cached hypertext transfer protocol requests.

According to one or more embodiments or any of the method embodiments herein, the hypertext transfer protocol request activities comprise a collection of .NET objects of type hypertext transfer protocol client or comment.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments, as generally described and illustrated in the figures herein, may be arranged and designed in a wide variety of different configurations. Thus, the detailed description of the embodiments, as represented in the attached figures, is not intended to limit the scope as claimed, but is merely representative of selected embodiments.

The features, structures, or characteristics described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in one or more embodiments. Thus, discussion of the features and advantages, and similar language, throughout this specification may, but do not necessarily, refer to the same embodiment.

Furthermore, the described features, advantages, and characteristics of the one or more embodiments herein may be combined in any suitable manner. One skilled in the relevant art will recognize that this disclosure can be practiced without one or more of the specific features or advantages of a particular embodiment. In other instances, additional features and advantages may be recognized in certain embodiments that may not be present in all embodiments.

One having ordinary skill in the art will readily understand that this disclosure may be practiced with steps in a different order, and/or with hardware elements in configurations which are different than those which are disclosed. Therefore, although this disclosure has been described based upon these preferred embodiments, it would be apparent to those of skill in the art that certain modifications, variations, and alternative constructions would be apparent, while remaining within the spirit and scope of this disclosure. In order to determine the metes and bounds of this disclosure, therefore, reference should be made to the appended claims.

The invention claimed is:

1. A method implemented by a robotic process automation workflow designer application comprising a hypertext transfer protocol recorder feature, the robotic process automation workflow designer application embodied in software stored on at least one memory and executed by at least one processor, the method comprising:

filtering hypertext transfer protocol requests to provide filtered hypertext transfer protocol requests;

recording the filtered hypertext transfer protocol request to provide recorded hypertext transfer protocol requests;

converting the recorded hypertext transfer protocol requests into hypertext transfer protocol request activities;

generating a sequence from the hypertext transfer protocol request activities; and executing, by a robotic process automation robot as a local instance in parallel with one or more processes on a computing system, a workflow using the sequence from the hypertext transfer protocol request activities.

2. The method of claim 1, wherein the robotic process automation workflow designer application operates to launch the hypertext transfer protocol recorder feature.

3. The method of claim 1, wherein the robotic process automation workflow designer application receives one or more configuration inputs that modify the sequence.

4. The method of claim 1, wherein the robotic process automation workflow designer application comprises a custom integration service connector builder configured to create custom connections from the recorded hypertext transfer protocol requests after importing.

5. The method of claim 1, wherein the robotic process automation workflow designer application maps between display values and hypertext transfer protocol response to automatically generate a user interface view for the robotic process automation workflow designer application.

6. The method of claim 1, wherein the recorded hypertext transfer protocol requests comprise .NET objects of type cached hypertext transfer protocol requests.

7. The method of claim 6, wherein the hypertext transfer protocol request activities comprise a collection of .NET objects of type hypertext transfer protocol client or comment.

8. The method of claim 1, wherein the sequence comprising the hypertext transfer protocol request activities is generated in the robotic process automation workflow designer application utilizing a configuration to execute the workflow.

9. The method of claim 8, wherein the configuration comprises generating the hypertext transfer protocol request activities as parametrized hardcoded data.

10. The method of claim 1, wherein the hypertext transfer protocol recorder feature monitors hypertext transfer protocol traffic to generate the sequence from the hypertext transfer protocol request activities in contrast to capturing user interface interactions.

11. A non-transitory computer readable medium storing program code for a robotic process automation workflow designer application that further comprises a hypertext transfer protocol recorder feature, the program code of the non-transitory computer readable medium being executed by at least one processor to implement the robotic process automation workflow designer application to cause operations comprising:

filtering hypertext transfer protocol requests to provide filtered hypertext transfer protocol requests;

recording the filtered hypertext transfer protocol request to provide recorded hypertext transfer protocol requests;

converting the recorded hypertext transfer protocol requests into hypertext transfer protocol request activities;

generating a sequence from the hypertext transfer protocol request activities; and executing, by a robotic process automation robot as a local instance in parallel with one or more processes on a computing system, a workflow using the sequence from the hypertext transfer protocol request activities.

12. The non-transitory computer readable medium of claim 11, wherein the robotic process automation workflow designer application operates to launch the hypertext transfer protocol recorder feature.

13. The non-transitory computer readable medium of claim 11, wherein the robotic process automation workflow designer application receives one or more configuration inputs that modify the sequence.

14. The non-transitory computer readable medium computer of claim 11, wherein the robotic process automation workflow designer application comprises a custom integration service connector builder configured to create custom connections from the recorded hypertext transfer protocol requests after importing.

15. The non-transitory computer readable medium of claim 11, wherein the robotic process automation workflow designer application maps between display values and hypertext transfer protocol response to automatically generate a user interface view for the robotic process automation workflow designer application.

16. The non-transitory computer readable medium of claim 11, wherein the recorded hypertext transfer protocol requests comprise .NET objects of type cached hypertext transfer protocol requests.

17. The non-transitory computer readable medium of claim 16, wherein the hypertext transfer protocol request activities comprise a collection of .NET objects of type hypertext transfer protocol client or comment.

18. A system comprising:

at least one memory storing code for a robotic process automation workflow designer application comprising a hypertext transfer protocol recorder feature; and at least one processor executing the code to implement robotic process automation workflow designer application and cause operations within the system comprising:

filtering hypertext transfer protocol requests to provide filtered hypertext transfer protocol requests;

recording the filtered hypertext transfer protocol request to provide recorded hypertext transfer protocol requests;

converting the recorded hypertext transfer protocol requests into hypertext transfer protocol request activities;

generating a sequence from the hypertext transfer protocol request activities; and executing, by a robotic process automation robot as a local instance in parallel with one or more processes on the system, a workflow using the sequence from the hypertext transfer protocol request activities.

19. The system of claim 18, wherein the robotic process automation workflow designer application operates to launch the hypertext transfer protocol recorder feature.

20. The system of claim 18, wherein the robotic process automation workflow designer application receives one or more configuration inputs that modify the sequence.

\* \* \* \* \*